Sept. 1, 1964     R. W. WILSON     3,146,896
APPARATUS FOR LOOPING TOBACCO LEAVES IN SERIES INTERCONNECTED
HANDS AND MOUNTING THE SAME ON TOBACCO STICKS AND
METHOD OF USING THE SAME
Filed May 28, 1959     13 Sheets-Sheet 1

INVENTOR
Robert W. Wilson
BY Cushman, Darby & Cushman
ATTORNEY

Sept. 1, 1964  R. W. WILSON  3,146,896
APPARATUS FOR LOOPING TOBACCO LEAVES IN SERIES INTERCONNECTED
HANDS AND MOUNTING THE SAME ON TOBACCO STICKS AND
METHOD OF USING THE SAME
Filed May 28, 1959  13 Sheets-Sheet 3

INVENTOR
Robert W. Wilson

BY Cushman, Darby & Cushman
ATTORNEYS

INVENTOR
ROBERT W. WILSON
BY Cushman, Darby & Cushman
ATTORNEYS

Sept. 1, 1964 R. W. WILSON 3,146,896
APPARATUS FOR LOOPING TOBACCO LEAVES IN SERIES INTERCONNECTED
HANDS AND MOUNTING THE SAME ON TOBACCO STICKS AND
METHOD OF USING THE SAME
Filed May 28, 1959 13 Sheets-Sheet 5
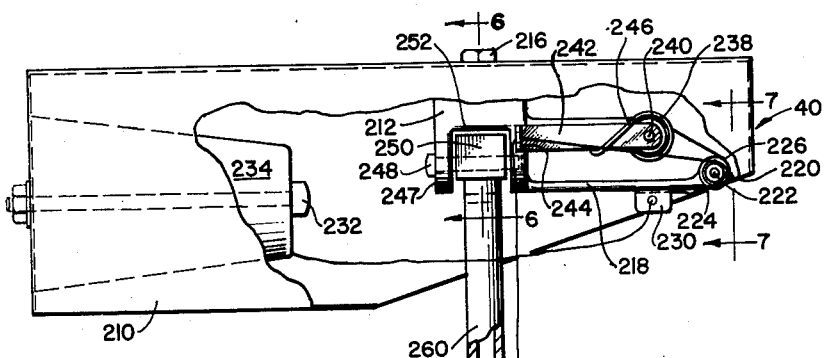
FIG. 5
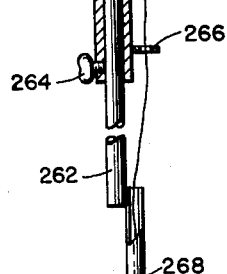
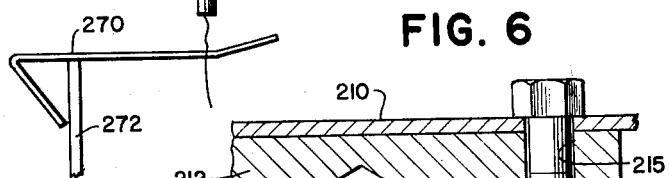
FIG. 6
FIG. 7
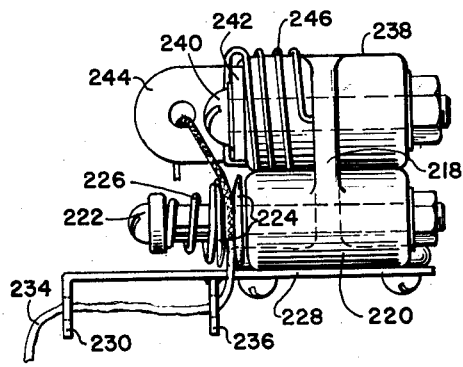
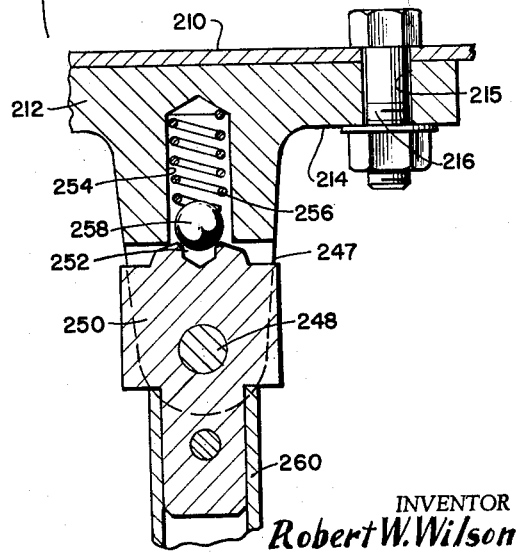
INVENTOR
*Robert W. Wilson*
BY *Cushman, Darby & Cushman*
ATTORNEY Sept. 1, 1964  R. W. WILSON  3,146,896
APPARATUS FOR LOOPING TOBACCO LEAVES IN SERIES INTERCONNECTED
HANDS AND MOUNTING THE SAME ON TOBACCO STICKS AND
METHOD OF USING THE SAME
Filed May 28, 1959  13 Sheets-Sheet 6

INVENTOR
ROBERT W. WILSON

BY *Cushman, Darby & Cushman*
ATTORNEYS

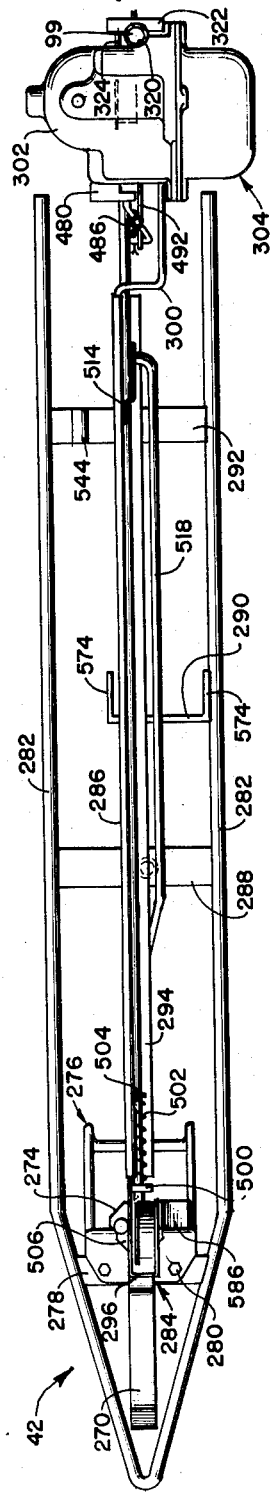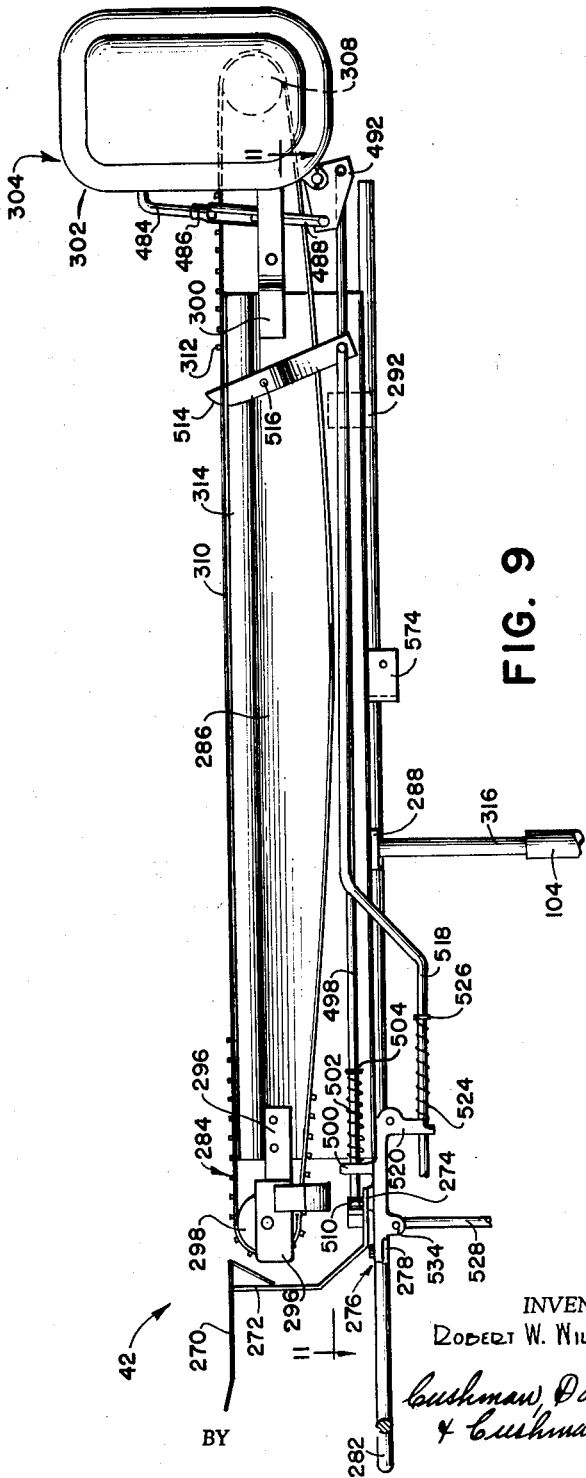

INVENTOR
Robert W. Wilson
BY Cushman, Darby & Cushman
ATTORNEYS

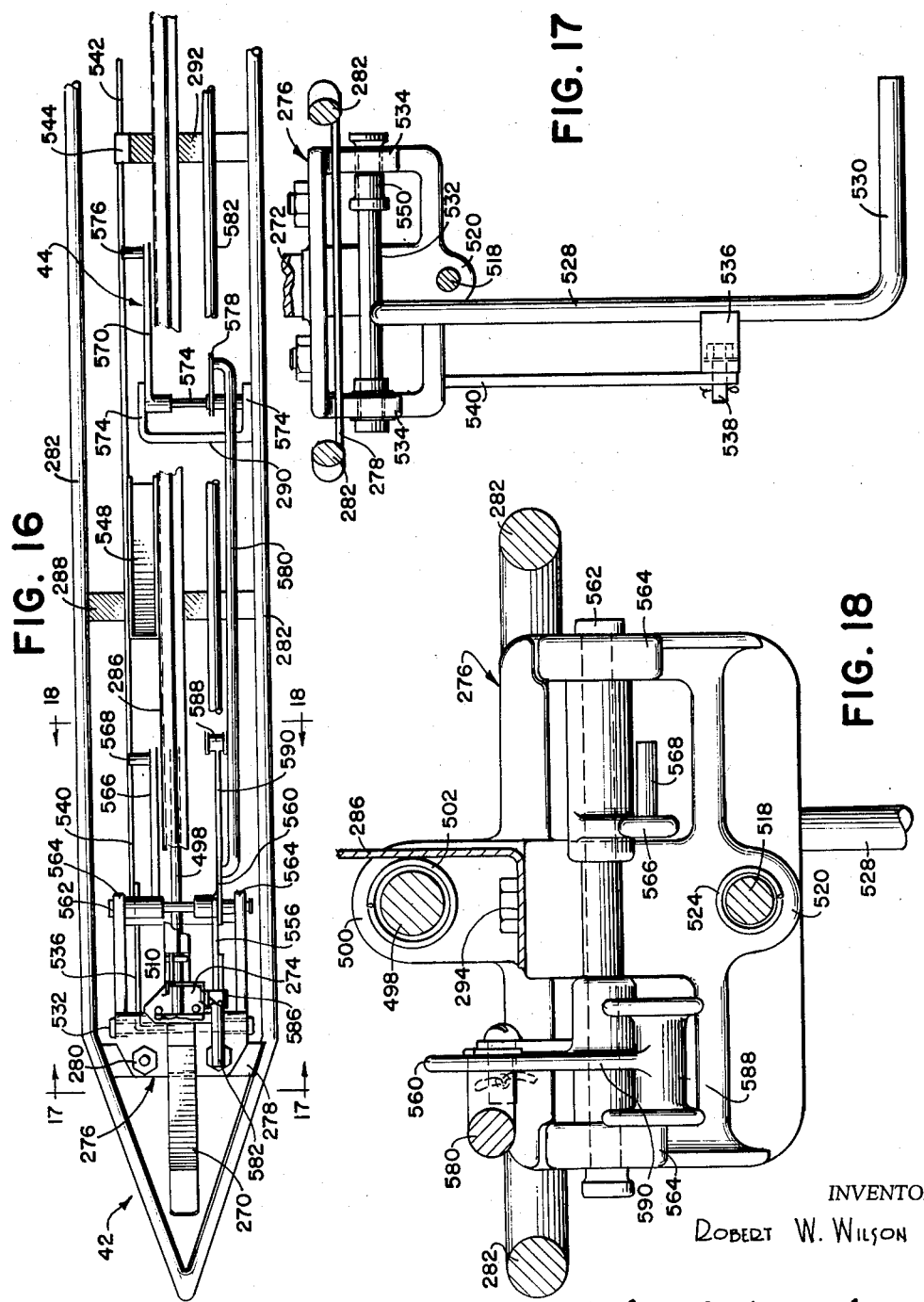

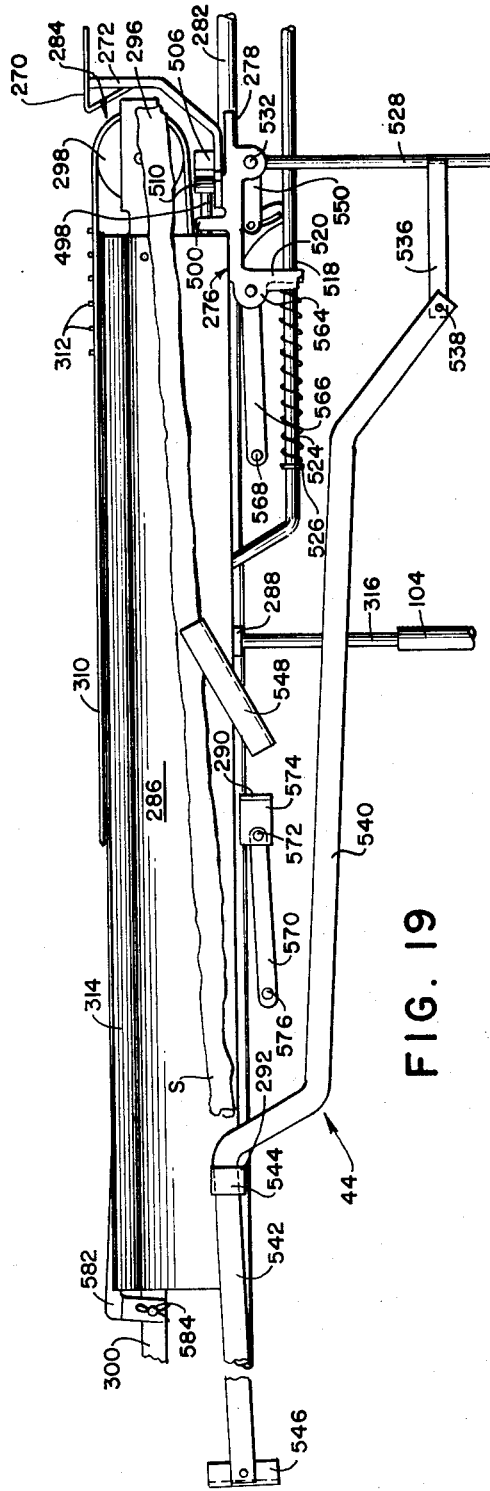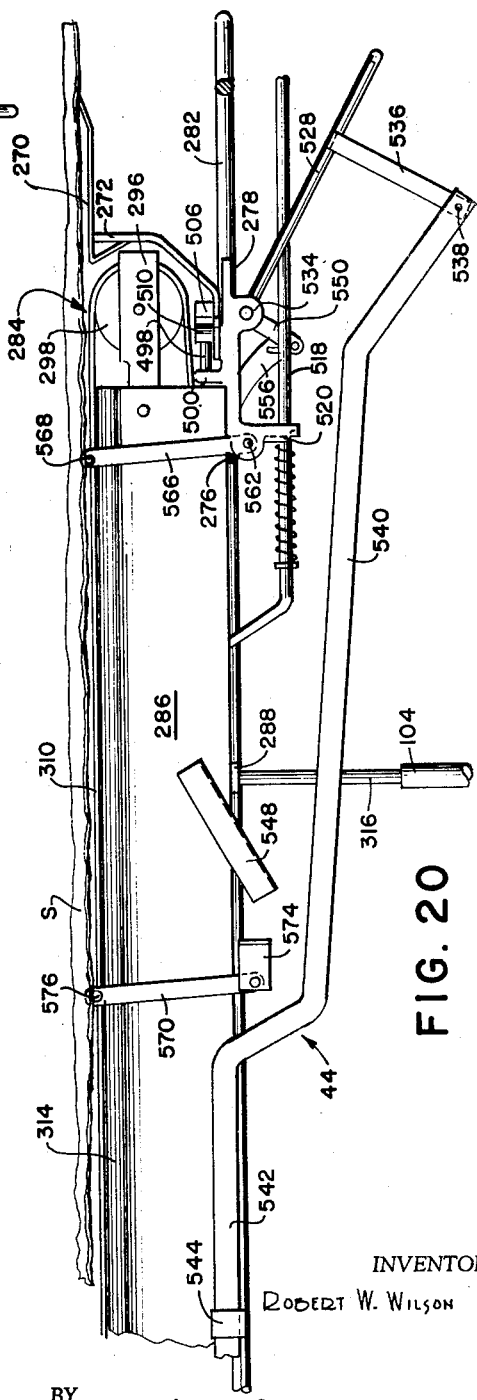

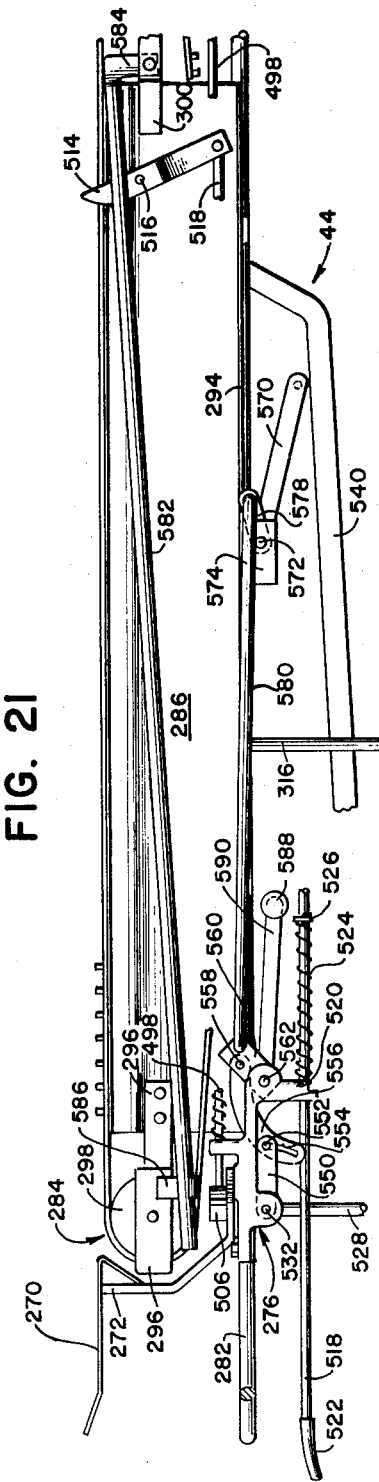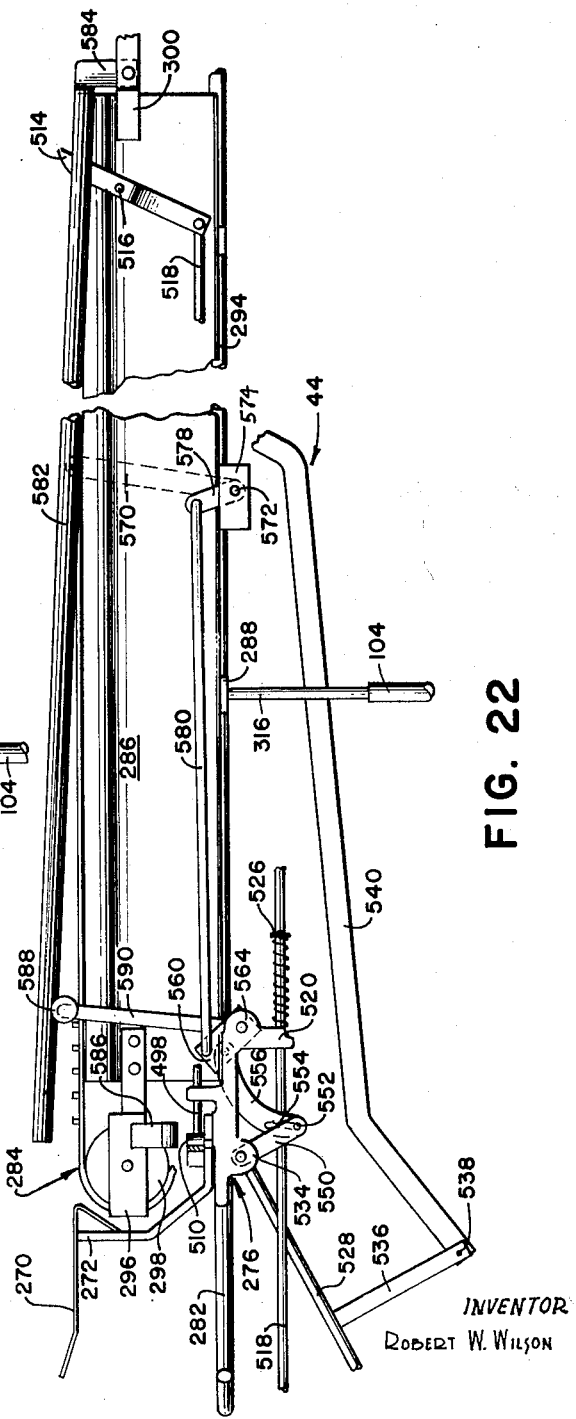

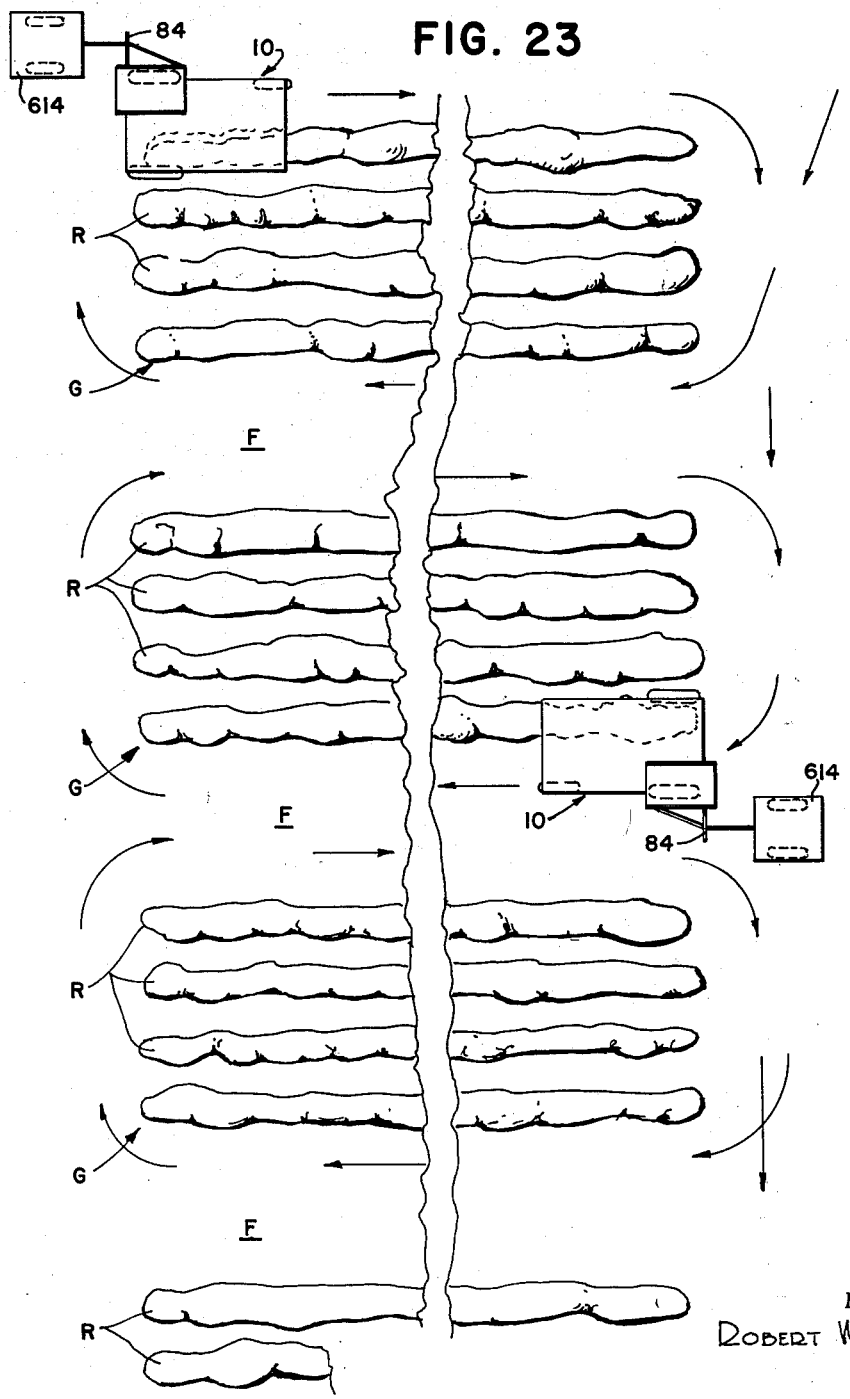

United States Patent Office 3,146,896
Patented Sept. 1, 1964

3,146,896
APPARATUS FOR LOOPING TOBACCO LEAVES IN SERIES INTERCONNECTED HANDS AND MOUNTING THE SAME ON TOBACCO STICKS AND METHOD OF USING THE SAME
Robert W. Wilson, Charlotte, N.C., assignor to R. H. Bouligny, Inc., Charlotte, N.C., a corporation of North Carolina
Filed May 28, 1959, Ser. No. 820,069
23 Claims. (Cl. 214—5.5)

This invention relates to tobacco harvesting and more particularly to apparatus and method for looping string about tobacco leaves to tie the same into successive series interconnected hands, mounting the hands on a tobacco stick and handling the tobacco sticks.

While there have been machines proposed which would mechanize to some extent the present hand labor practices utilized in harvesting tobacco, in general, these proposals have not been practical or commercially successful. The only machine commercially available which aids in the harvesting of tobacco must be operated by no less than nine attendants and, therefore, equipment of this type has proven successful only in farms which have a relatively high number of acres planted in tobacco, for example, acreage of the order of 27 acres or more. The number of farms having 27 acres or more planted in tobacco constitutes a relatively small percentage of the entire acreage allotment to tobacco in the southern states of this country. Present information indicates that the average tobacco allotment in North Carolina and adjoining states is approximately five acres. Thus, for the overwhelming majority of tobacco farmers, commercial machines have not proven economically practical for their operation.

Accordingly, an object of the present invention is to provide apparatus capable of performing many of the operations heretofore performed by manual labor in the harvesting of tobacco, which apparatus is sufficiently economical to produce, and sufficiently easy to operate by a minimum number of attendants so as to render the same useful to farmers having an average tobacco allotment.

In the normal manual labor method of harvesting tobacco, the "primers" pass through the field removing the lower most leaves on the tobacco stalks by hand and placing them in a tobacco sled or truck which is moved along the row either by mule or tractor, usually mule. The primed tobacco is then gathered into hands and each hand is tied and placed on a tobacco stick. Subsequently the tobacco sticks are stored in a tobacco barn for curing.

The apparatus of the present invention includes means operable to mechanize the tying of the tobacco leaves into hands and the mounting of the tied hands onto the tobacco sticks. Moreover, the present invention contemplates a novel method of handling the tobacco hand carrying sticks from the time that the hands are placed thereon to the time that the sticks are placed in the curing barn.

The manner in which the tobacco leaves are looped into successive series interconnected hands before placement on the tobacco stick is in accordance with the method described and claimed in commonly assigned Poythress application, Serial No. 552,027, filed December 9, 1955 which issued Septmber 15, 1959, as Patent No. 2,904,193.

In general, the Poythress application discloses an apparatus which is operable by one man, the apparatus providing an operator's station and means for supplying and tensioning a length of string disposed adjacent the operator's station. A movable arm is provided on the apparatus adjacent the string supplying means for aiding the operator in looping the string about the tobacco hands. In performing the Poythress method, the operator rides on the apparatus down the row and removes leaves from the tobacco plants. These leaves are positioned in bunches so that their stem ends are in substantial alignment. When a sufficient number of leaves have been primed to make up a hand of tobacco, these leaves are moved into engagement with the arm and also into engagement with a length of string extending from the point of restraint of the latter. The operator then moves the tobacco hand about the point of string restraint while at all times maintaining a tension in the length of string engaged thereby, thus looping the string about the aligned stem ends of the hand. The hand thus tied is then supported by the arm and the operator then gathers the necessary leaves for the next hand and repeats the procedure set forth above, this time moving the hand of tobacco leaves about the point of string restraint in a direction opposite to that of the previous hand on the opposite side of the arm. By repeating the above procedure there is formed successive tobacco hands interconnected in series by the string. These series interconnected hands are conveyed into a position enabling a tobacco stick to be manually inserted in supporting relation thereto, An object of the present invention is to provide apparatus of the type described having an improved mechanism for carrying out the procedure noted above.

Still another object of the present invention is the provision of a machine of the type described having a movable looping arm, an independently-powered conveyor for moving the looped tobacco hands into a stick receiving position and improved means for actuating the conveyor in response to the movement of the looping arm.

Still another object of the present invention is the provision of mechanism of the type described in which means is provided for controlling the distance of travel of the conveyor in response to the movement of the looping arm.

A further object of the present invention is the provision of apparatus of the type described having a conveyor for moving successive series interconnected hands of tobacco into a stick receiving position and means for indicating when the conveyor has moved the hands into such position.

A still further object of the present invention is the provision of a machine of the type described having an improved means for supplying a length of string to be looped about successive hands of tobacco and for effecting a desired tension on the string supplied thereby.

Still another object of the present invention is the provision of a string supplying and tensioning means having an arm for directing the string to convenient access of the operator, such arm being mounted for movement out of said access position when desired.

Still another object is the provision of an apparatus of the type described having means for effecting movement of a tobacco stick into supporting engagement with the series interconnected hands supported by the conveyor.

Still another object of the present invention is stick moving mechanism of the type described which is operable to effect an initial longitudinal rearward movement of the stick and a subsequent vertical, generally translational movement of the stick into supporting engagement with the series interconnected tobacco hands.

As noted above, the apparatus disclosed in the Poythress application provides a single operator's station and is particularly adapted for one-man operation. It has been found that a more efficient operation can be achieved by apparatus arranged to accommodate two attendants. The present invention contemplates the provision of a vehicle frame of the arched type arranged to straddle a row of tobacco plants and providing two operator's stations on opposite sides of the straddled row, the vehicle being provided with a single driving wheel means, a single foot operated steering wheel means mounted generally forwardly of the driving wheel means and a lateral wheel means mounted in a position generally opposite that of the driving wheel means. It has been found that the arrangement set forth above provides maximum economy and maximum maneuverability of the vehicle with control thereof by one of the attendants.

Accordingly, it is a still further object of the present invention to provide a vehicle frame of the type described which is sturdy in construction, economical to manufacture, and stable and versatile in operation.

The present invention also contemplates the utilization of a conventional trailer in conjunction with the above-mentioned vehicle for the purpose of further facilitating the entire tobacco harvesting procedure. More specifically, the present invention contemplates the provision of a novel procedure for handling the tobacco sticks from the time the series interconnected hands have been mounted thereon to the time they are placed in the tobacco barn.

In accordance with present planting practice, a tobacco field is planted in a series of parallel rows being planted in groups of four equally spaced rows so that the spacing between each group is considerably greater than the spacing between the rows of each group. The present invention provides a novel method of proceeding through a tobacco field whereby the vehicle is at all times maintained in a predetermined position with respect to the larger space between row groups so that a trailer can be detachably connected therewith for movement down such space, such trailer being utilized not only to receive the tobacco sticks as the tobacco hands are mounted thereon, but to convey such sticks to the curing barn.

These and other objects of the present invention will become more apparent during the course of the following detailed description and appended claims.

The invention may best be understood with reference to the accompanying drawings wherein an illustrative embodiment is shown.

In the drawings:

FIGURE 5 is a side elevational view, with parts broken away, of the string supplying and tensioning mechanism;

FIGURE 6 is an enlarged fragmentary cross-sectional view taken along the line 6—6 of FIGURE 5;

FIGURE 7 is a fragmentary elevational view taken along the line 7—7 of FIGURE 5;

FIGURE 9 is a side elevational view of the tobacco hand looping and conveying mechanism with the associated stick moving mechanism parts removed for purposes of clearer illustration;

FIGURE 10 is a top plan view of the mechanism shown in FIGURE 9;

FIGURE 16 is a fragmentary top plan view of the tobacco hand looping and conveying mechanism and the stick moving mechanism, with certain parts broken away for purposes of clearer illustration;

FIGURE 17 is an enlarged fragmentary cross-sectional view taken along the line 17—17 of FIGURE 16;

FIGURE 18 is an enlarged fragmentary cross-sectional view taken along the line 18—18 of FIGURE 16;

FIGURE 19 is a side elevational view of the tobacco looping and conveying mechanism and the tobacco stick moving mechanism, the latter being shown in its inoperative position;

FIGURE 20 is a view similar to FIGURE 19 showing the stick moving mechanism in its operative position;

FIGURE 21 is a side elevational view of the stick moving mechanism in its inoperative position corresponding to FIGURE 19, looking in the direction of the opposite side thereof;

FIGURE 22 is a view similar to FIGURE 21 showing the parts in their operative position, corresponding to FIGURE 20; and FIGURE 23 is a schematic top plan view of a tobacco field indicating the manner in which the apparatus of the present invention is utilized therein.

Referring now more particularly to the drawings, there is shown in FIGURES 1–4 an apparatus embodying the principles of the present invention. In general, the apparatus comprises a self-propelled, foot pedal steered, three wheeled vehicle frame, generally indicated at 10, which includes a left hand side frame 12 and a right hand side frame 14, rigidly interconnected in horizontally spaced relation by a horizontal top frame 16. Preferably, the top frame is positioned a vertical distance above ground level sufficient to permit the passage of mature tobacco plants thereunder.

Figure 3:
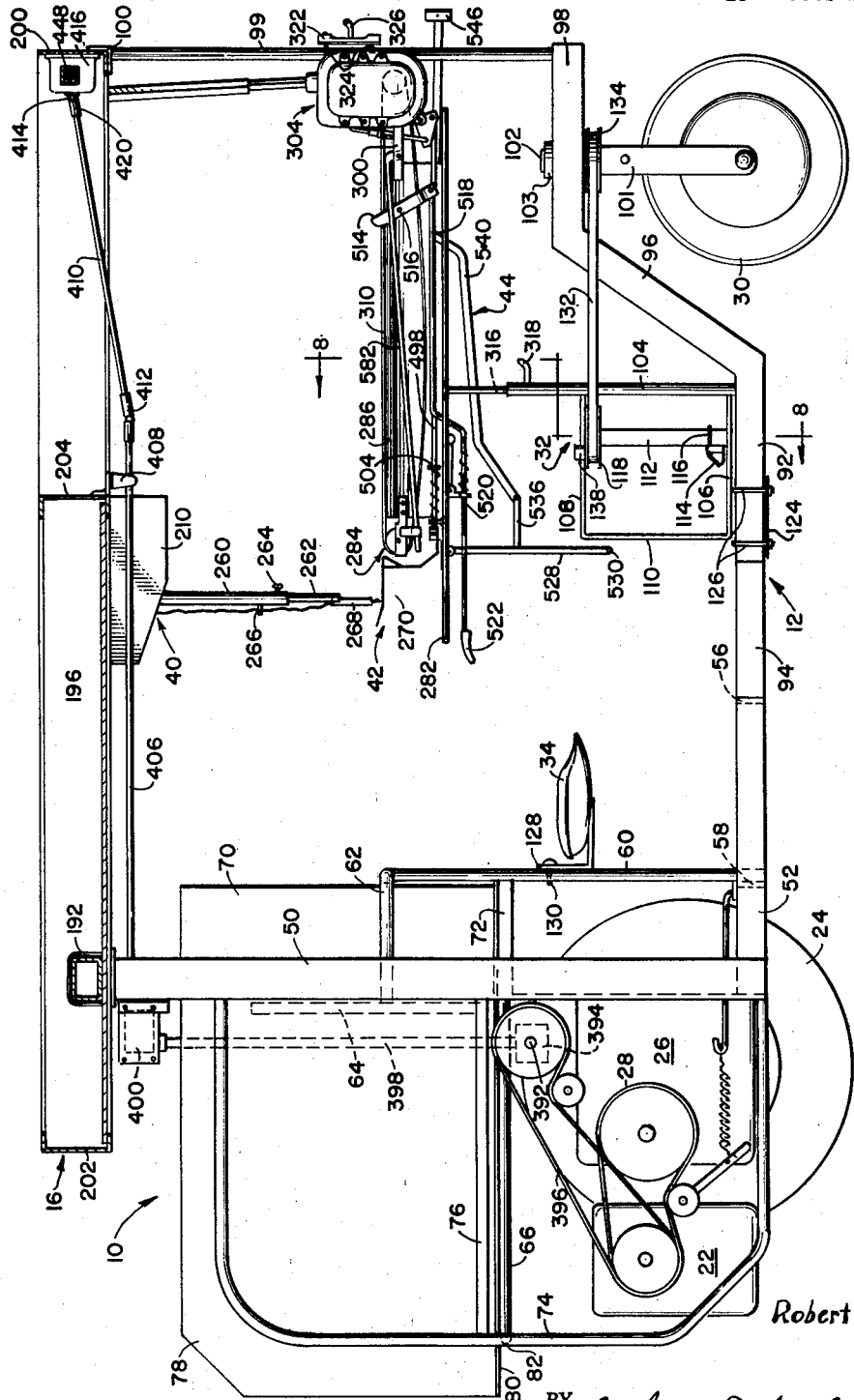
FIGURE 3 is a cross-sectional view taken along the line 3—3 of FIGURE 1.

The vehicle frame 10 is self-propelled by an internal combustion engine 22 or the like mounted on the rear portion of the left hand side frame 12. As best shown in FIGURE 3, the internal combustion engine 22 drives a rear traction wheel 24, suitably journalled on the rear portion of the left hand side frame through a power transmission assembly 26 of a suitable design, the power transmission assembly being drivingly connected with the engine 22 by any suitable means, such as a belt and pulley assembly 28.

Mounted on the forward end of the left hand side frame 12 in a position of general longitudinal alignment with the rear traction wheel 24 is a steering wheel 30 having a foot pedal actuated steering mechanism, generally indicated at 32, connected therewith so that an operator stationed at an operator's seat 34 mounted just forwardly of the traction wheel 24 can steer the wheel 30 by actuating the mechanism 32 with his feet.

The right hand side frame includes a rear idler wheel 36 which is disposed in a position generally laterally opposite the rear traction wheel 24. A second operator may be stationed at an operator's seat 38 mounted just forwardly of the idler wheel 36. As stated above, the apparatus of the present invention provides improved means for performing the tobacco hand tying or looping method set forth in the above-mentioned Poythress application. To this end, there is mounted in a position of convenient access adjacent each of the operator's seats 34 and 38 a string supplying and tensioning mechanism, generally indicated at 40. Each mechanism 40 is arranged to supply a length of string for use by the operator in looping or tying the tobacco leaves into series inter-connected hands in the normal operation of the apparatus. The mechanism 40 also serves to provide a fixed point of string restraint from which the string can be paid out and tensioned during normal operation. Adjacent each string supplying and tensioning mechanism 40, there is provided a looping arm and conveying mechanism, generally indicated at 42. Each mechanism 42 is operable by the attendant in conjunction with the string supplying and tensioning mechanism 40 to effect the looping of successive hands of tobacco and to move the successive series inter-connected hands into a stick-receiving position. The present apparatus also provides a tobacco stick moving mechanism 44, associated with each of the looping arm and conveying mechanisms which is operable to effect movement of a tobacco stick into supporting engagement with the series inter-connected tobacco hands when they have been moved by the conveying mechanism into their stick-receiving position.

Vehicle Frame

Figure 1:
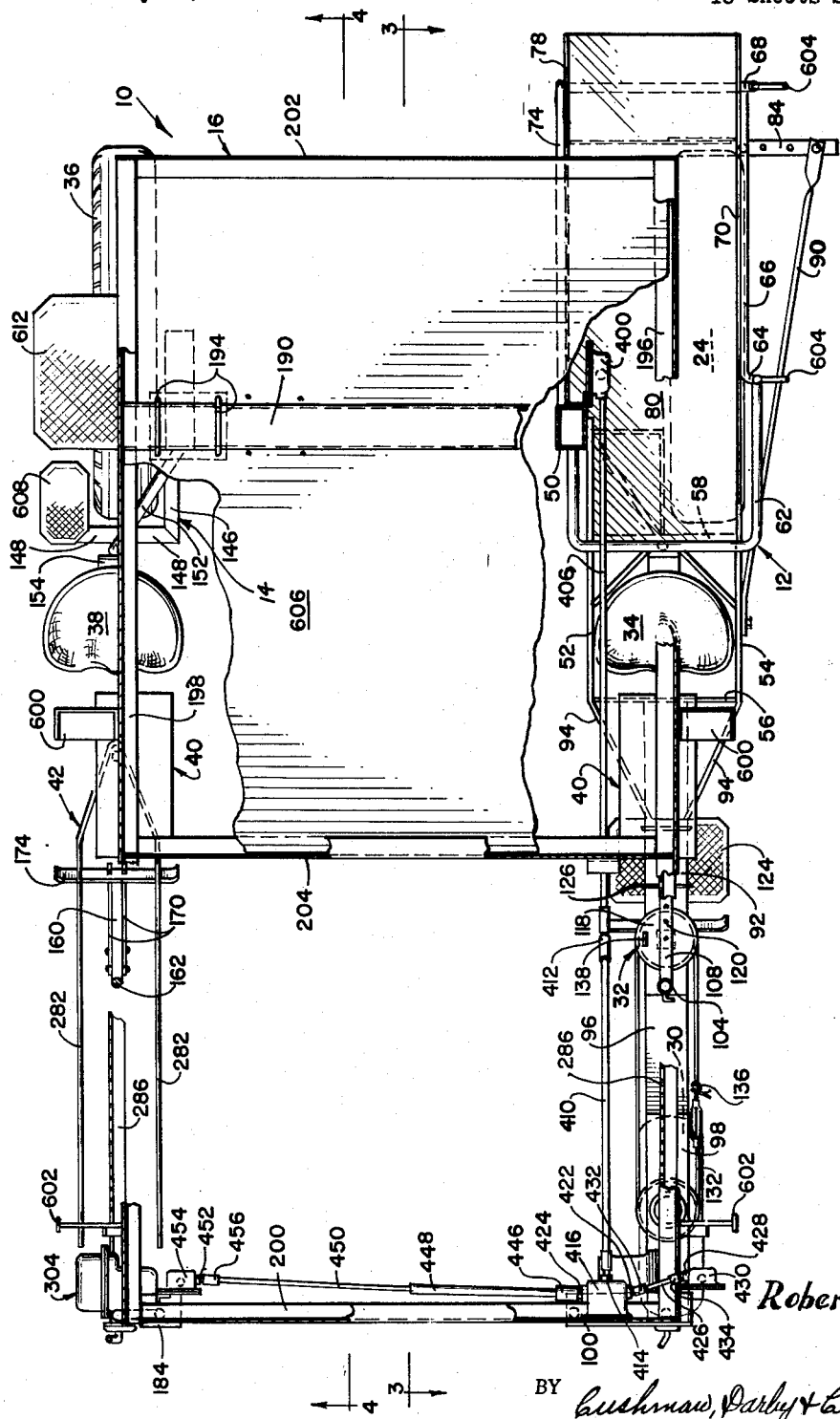
FIGURE 1 is a top plan view of an apparatus embodying the principles of the present invention.
Figure 2:
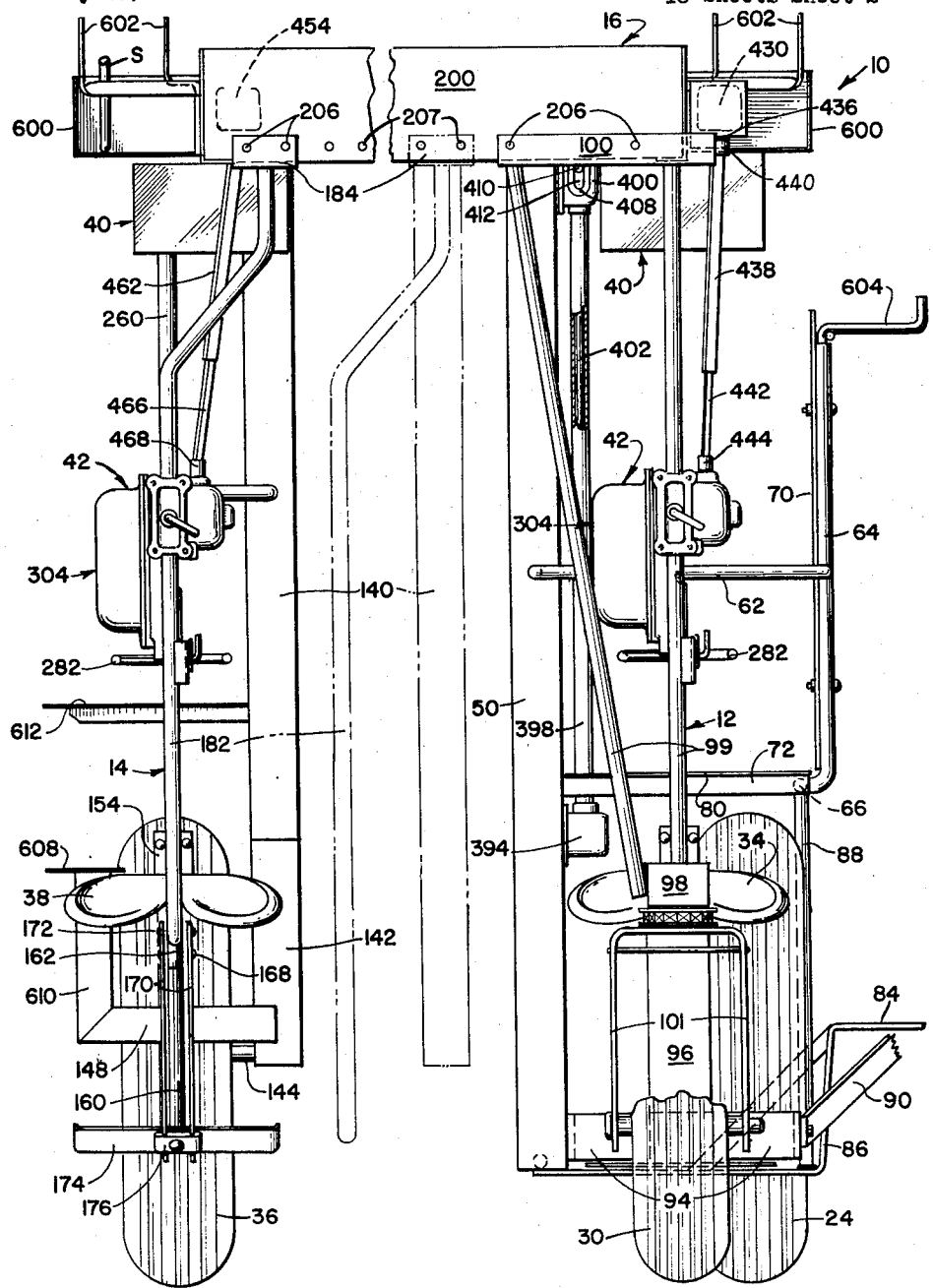
FIGURE 2 is a front elevational view of the apparatus.

The vehicle frame 10 may be of any suitable construction and, as indicated above, includes left and right hand side frames 12 and 14. As best shown in FIGURES 1, 2 and 3, the left hand side frame comprises a main vertical frame member 50 having its lower end rigidly secured, as by welding or the like, to the rear end of an inner horizontal frame member 52. Disposed in parallel relation to the horizontal frame member 52 is an outer horizontal frame member 54, the latter being rigidly inter-connected with the inner frame member 52 by a pair of longitudinally spaced transversely extending forward and rearward frame members 56 and 58. Extending upwardly from the central portion of the rearward transverse frame member 58 is a central vertical frame member 60, preferably in the form of a pipe or tube, having its upper end rigidly secured, as by welding or the like, to the central portion of a U-shaped frame member or tube 62. One leg of the U-shaped frame member 62 is rigidly secured to the central portion of the main vertical frame member 50 while the other leg thereof is rigidly secured to an outer vertical frame member 64, also in the form of a pipe or tube, intermediate the ends thereof. The lower end of the tube 64 is rigidly secured to the forward portion of an outer horizontal frame member 66 of tubular construction. Mounted in parallel relation to the member 64 and rigidly secured to the rear portion of the horizontal tube 66 is a rearward vertical tubular frame member 68, the forward and rearward tubes 64 and 68 receiving an outer compartment forming panel 70. The forward end of the horizontal tube 66 is rigidly secured, as by welding or the like, to one leg of an intermediate U-shaped frame member 72 having its central portion rigidly secured to the vertical frame member 60 and its opposite leg rigidly secured to the main vertical frame member 50.

Extending rearwardly from the lower end of the vertical frame member 50 and rigidly secured thereto is one leg of a generally C-shaped tubular frame member 74. As best shown in FIGURE 3, the C-shaped tube 74 extends rearwardly from the lower end of the frame member 50, then vertically upwardly, and then horizontally forward or rigid attachment to the upper portion of the main vertical frame member 50. If desired, an intermediate strengthening tube 76 is rigidly secured between the intermediate portion of the C-shaped tube and an intermediate portion of the vertical frame member 50.

The upper portion of the C-shaped frame member and the strengthening tube 76 receive an inner compartment forming panel 78 and a bottom panel 80 is secured to the upper surface of the U-shaped frame member 72, tube 66, and a rearward transverse tube 82 extending between the C-shaped tube 74 and the rearward end of the tube 66.

It will be understood that the engine 22 and transmission assembly 26 are suitably mounted in a position below the panel 80, the transmission assembly 26 having an output shaft which constitutes the axle of the wheel 24 and serves to mount and receive the latter.

As best shown in FIGURES 1 and 2, a transversely disposed draw bar 84 extends outwardly from the rearward portion of the left hand side frame 12, the draw bar 84 having its inner end rigidly secured to a braced angular strap 86. The strap 86 has one end secured to the C-shaped tube 74 and extends transversely across the side frame rearwardly of the traction wheel 24 and then upwardly for rigid securement to the draw bar 84. The strap 86 is also braced by a vertical tube 88 having its lower end rigidly secured thereto and its upper end rigidly secured to the horizontal tube 66. The outer end of the draw bar 84 has the rear end of a diagonal brace 90 connected therewith, the forward end of which is rigidly secured to the outer horizontal frame member 54.

Rigidly secured to and extending forwardly from the forward transverse frame member 56 is a rearward longitudinal frame section 92 braced by diagonal straps 94 extending from the ends of the frame member 56 thereto. An intermediate inclined frame section 96 extends upwardly and forwardly from the section 92 and has a forward frame section 98 extending horizontally forwardly therefrom. A pair of forward upward diverging vertical tubular frame members 99 is rigidly secured at its lower end to the forward end of the frame section 98 and has an angle iron bracket 100 fixed to their upper ends for engagement with the top frame 16.

The forward steering wheel 30 is mounted beneath the forward frame section 98, as by an inverted U-shaped yoke 101 having a rigid upwardly extending shaft 102 journalled in a bearing 103 mounted in the frame section 98.

The foot operated steering mechanism 32 includes a vertical tube 104 having its lower end rigidly secured to the rearward frame section 92. Rigidly secured to the vertical tube 104 is a U-shaped frame member or strap having horizontally extending legs 106 and 108 fixed to the tube 104 in vertically spaced relation and a vertically extending bight portion 110. Mounted between the horizontal legs 106 and 108 is a vertical shaft 112 having a foot pedal bar 114 vertically adjustably mounted on the lower end portion thereof, as by a U-bolt 116, and a sheave 118 rigidly secured to the upper end thereof.

Figure 8:
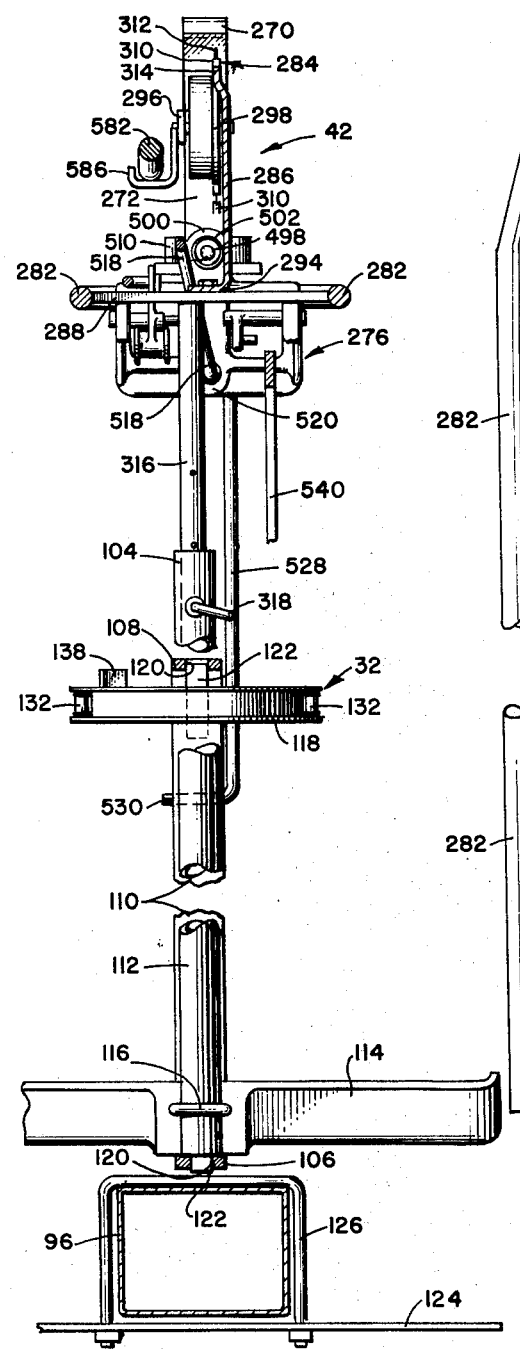
FIGURE 8 is a cross-sectional view taken along the line 8—8 of FIGURE 3.

As best shown in FIGURES 1 and 8, the shaft 112 is mounted for movement into a plurality of longitudinal adjusted positions between the legs 106 and 108. To this end, the legs are provided with a series of spaced apertures 120 arranged to receive pins 122 extending from the upper and lower ends of the shaft 112. It will be seen that the length of the lower pin 122 is less than the distance between the upper surface of the sheave 118 and the lower surface of the leg 108 so that the shaft may be moved into different positions of longitudinal adjustment by moving the same vertically upwardly until the lower pin is disengaged from the aperture 120 in the lower leg 106. The lower end of the shaft can then be moved laterally until the upper pin 122 is removed from the aperture in the upper leg 108. By reversing this procedure the shaft 112 may be positioned between the legs 106 and 108 in any pair of aligned apertures 120 therein to thereby accommodate the particular operator.

In this regard, a foot rest plate 124 is secured to the horizontal frame section 92, by any suitable means, such as a U-bolt 126, so that it may be alternatively mounted on the lower surface or upper surface of the frame section to accommodate the particular operator. It will also be noted that the seat 34 is mounted for movement into different positions of vertical adjustment as by an L-shaped bracket 128, one leg of which carries the seat and the other leg of which is adjustably fixed to the vertical tube 60, as by a U-bolt 130.

As best shown in FIGURE 3, it will be seen that an operator stationed on the seat 34 will have his legs extending to the plate 124 and pedal bar 114. By applying pressure to one side of the pedal bar or the other, shaft 112 may be suitably rotated and since the sheave 118 is fixed to the shaft it will rotate therewith. A chain 132 is trained about sheave 118 and a similar sheave 134 fixed to the yoke 101 below the frame section 98. To accommodate the longitudinal adjustment of the shaft 112, the chain 132 is interconnected into an endless structure by a hook and turnbuckle 136, see FIGURE 1. The turning radius of the wheel 30 is limited by means of an upstanding lug 138 rigid with the sheave 118 and disposed in a position to engage one side of the leg 108.

Figure 4:
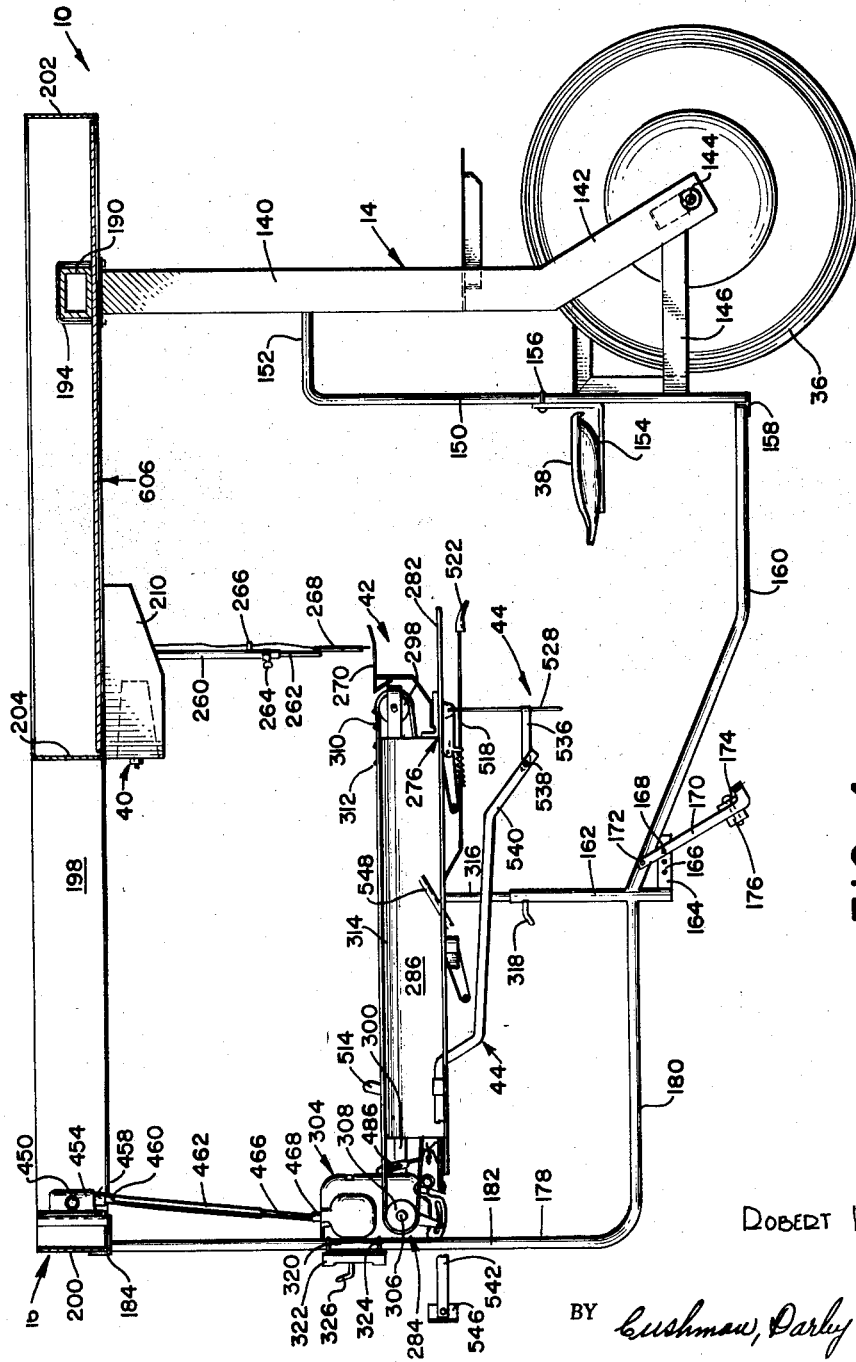
FIGURE 4 is a cross-sectional view taken along the line 4—4 of FIGURE 1.

As best shown in FIGURES 1, 2 and 4, the right hand side frame 14 comprises a main vertical frame member 140 having a lower inclined portion 142 extending in a direction downwardly and rearwardly. Rigidly secured to the lower end of the inclined portion 142 is a stub shaft 144 upon which the wheel 36 is rotatably mounted. A horizontal frame member 146 has its rearward edge rigidly secured to the lower forward end of the inclined portion 142 and its forward end connected to a transversely outwardly extending frame member 148. Secured to the central portion of the transverse frame member 148 is a vertical tube 150 having its upper end bent inwardly, as indicated at 152, for rigid securement to the main vertical frame member 140.

The seat 38 is mounted for vertical adjustment on the tube 150 by an L-shaped bracket 154, one leg of which is fixed to the seat and the other leg of which is secured to the tube 150, as by a U-bolt 156, see FIGURE 4. Secured to the lower end of the tube 150 is a pair of short angle irons 158, the forward one of which is rigidly secured to the rearward end of an angular tube 160. The forward end of the tube 160 is rigidly secured to the lower portion of a vertical tube 162 and a bar 164 is rigidly secured between the lower end of the tube 162 and the adjacent portion of the bar 160. The bar 164 is provided with a series of apertures 166 for selectively receiving a pin 168 arranged to secure a pair of parallel bars 170 to the strap 166. The upper end of the bars are pivotally mounted to the adjacent portion of the tube 160, as indicated at 172, and the lower portion of the bars have a foot rest bar 174 mounted thereon for longitudinal adjustment, as by a bolted clamp 176.

Rigidly secured to the lower forward portion of the vertical tube 162 just above the bar 164 is a tube 178 bent to form a horizontal frame section 180 extending forwardly from the tube 162 and a vertical tubular frame section 182 extending upwardly from the forward end of the section 180. The upper end of the vertical section 182 has a short length of angle iron 184 fixed thereto for engagement with the top frame 16.

The top frame 16 comprises a main box-shaped transverse frame member 190 arranged to be secured to the upper end of the main vertical frame members 50 and 140 of the left and right hand side frames, by any suitable means, such as U-bolts 192 and 194 respectively. Secured to opposite ends of the main transverse frame member 190 is a pair of longitudinally extending channel members 196 and 198. A forward transverse channel member 200 is rigidly secured between the forward ends of the longitudinal channel members 196 and 198 and a rearward transverse channel member 202 is rigidly secured between the rear ends of the longitudinal channel members 196 and 198. In addition, an intermediate transverse channel 204 is fixed between the longitudinal channel members 196 and 198 in a position between the frame member 190 and forward channel member 200. The latter is rigidly secured to the brackets 100 and 134 of the left and right hand side frames, respectively, by any suitable means, such as bolts 206.

As best shown in FIGURE 2, the forward channel member 200 is provided with a series of transversely spaced openings 207 for selectively receiving the bolts 206 so that the right hand side frame 14 can be moved into different positions of lateral adjustment with respect to the left hand side frame 12 to accommodate various tobacco row widths. Of course, the U-bolts 194 which serve to secure the main vertical frame member 140 of the right hand side frame to the transverse frame member 190 also provides for this lateral adjustability. In addition, the right hand side frame 14 may be moved laterally and secured by the bolts 206 and 194 in a position adjacent the left hand side frame, as shown in phantom lines in FIGURE 2, for the purpose of ease in shipping and otherwise facilitating the handling of the machine in merchandising the same. It will be noted that with the right side frame disposed in the phantom line position of FIGURE 2, a plurality of apparatus can be stacked for shipment from the manufacturer to the dealer.

String Supplying and Tensioning Mechanism

As noted above, the present apparatus provides a string supplying and tensioning mechanism 40 adjacent each operator's station. Since both of the mechanisms are substantially identical in construction, a description of one should suffice to give a clear understanding of both.

As best shown in FIGURES 5–7, the string supplying and tensioning mechanism 40 comprises a housing 210 of box-like configuration arranged to be suitably mounted beneath the corresponding longitudinal top frame member of the vehicle frame in a position just forwardly of the associated operator's seat. Mounted within the rearward portion of the housing 210 is a casting 212 including a pair of transversely extending upper flanges 214 having longitudinally elongated slots 215 formed therein to receive bolts 216 or the like which serve to secure the casting within the housing 210 in a desired position of longitudinal adjustment.

The casting 212 includes a rearwardly extending arm 218 having an apertured boss 220 formed on the outer end thereof for receiving a bolt 222. As best shown in FIGURE 7, the bolt 222 has mounted thereon a pair of string tensioning disks 224 of conventional design resiliently urged together by a spiral coil spring 226 mounted in surrounding relation to the bolt 222 between the head thereof and the outer disk 224. Suitably fixed to the arm 218 is a strap 228 having an apertured depending outer end 230 disposed in a position generally coaxial with a string mounting bolt 232 arranged to detachably secured a cone of string 234 in the forward portion of the housing with its axis extending in a horizontal longitudinal direction. The string from the cone 234 extends through the apertured end 230 of the strap and a depending lug 236 fixed to the strap 228 in spaced parallel relation to the apertured end 230. From the apertured lug 236, the string passes between the tensioning disks 224.

The casting arm 218 includes a second apertured boss 238 arranged to receive a bolt 240 which serves to pivotally receive one end of a string tension take-up arm 242, the opposite end of which is apertured and bent outwardly, as indicated at 244, to receive the string extending from the disks 224. A suitable coil spring 246 is connected between the arm 242 and casting 212 and serves to resiliently bias the string tensioning take-up arm in a clockwise direction, as viewed in FIGURE 5.

The casting 212 also includes a pair of longitudinally spaced mounting arms 247 extending downwardly between the flanges 214. Mounted between the arms 247, as by a longitudinally extending pivot pin 248, is a mounting member 250 having an upstanding apertured boss 252 formed on the upper end thereof. As best shown in FIGURE 6, the casing 212 between the arms 247 has an upwardly extending bore 254 formed therein for receiving a coil spring 256, the upper end of which engages the upper end of the bore and the lower end of which engages a ball 258 arranged to enter the apertured boss 252 of the mounting member 250. It will be seen that the spring pressed ball 258 serves to resiliently maintain the mounting member 250 in a vertical position but permits the same to be pivoted transversely about the pivot pin 248 against the action of the spring 256.

A tube 260 is fixed to the lower end of the mounting member 250 and has a smaller tube 262 mounted within the lower end thereof in vertical adjustable telescoping relation by any suitable means, such as a set screw 264. As best shown in FIGURE 5, an apertured lug 266 is rigidly secured to the lower end of the upper tube 260 for receiving the string from the tensioning take-up arm 242. From the apertured lug 266, the string passes through a short tube section 268 fixed to the lower end of the tube 262 in laterally offset relation thereto. The tube section 268 provides the point of string restraint about which the hands of tobacco are looped during the normal operation of the apparatus.

*Looping Arm and Conveying Mechanism*

Again, as indicated above, the present apparatus provides a pair of looping arm and conveying mechanisms 42, one associated with each string supplying and tensioning mechanism 40, and for each operator's station. Since the construction of the mechanisms 42 is substantially identical, a description of one should suffice to give a clear understanding of both.

As best shown in FIGURES 3, 4, and 8–11, the looping arm and conveying mechanism 42 comprises a generally horizontally disposed looping arm 270 which, as shown in FIGURE 5, is disposed in a position just below tube section 268 of the associated string supplying and tensioning mechanism 40. The arm 270 has its rearward end bent slightly upwardly and its forward end bent downwardly for securement to a bar 272, the upper end of which is rigidly secured to the lower surface of the arm and extends downwardly therefrom. The bar 272 is bent to form a forwardly extending horizontal end portion which is rigidly fixed to a block or plate 274 mounted on a main casting 276 for pivotal movement with respect thereto about a vertical axis. It can thus be seen that the looping arm 270 is pivotable to opposite sides of the point of string restraint provided by the tubular section 268 of the string supplying and tensioning mechanism 40. The casting 276 is rigidly secured to a transversely extending bar 278, as by bolts 280 or the like, the bar 278 being rigidly secured between the converging forward ends of a pair of horizontally spaced tobacco leaf spreading rods 282.

The looping arm and conveying mechanism 40 also includes an endless conveyor, generally indicated at 284, which comprises a main longitudinally extending frame plate 286 which is also fixedly secured to the rods 282 by a plurality of straps 288, 290 and 292. The frame plate 286 includes a lower horizontally extending flange 294 with has its rearward end fixed to the forward end of the main casting 276 and which is also suitably secured, as by welding or the like, to the straps 288, 290 and 292. Rigidly secured to the rearward end of the frame plate 286, is a generally J-shaped strap 296 having a sprocket wheel 298 journalled between the rearward spaced legs thereof. As best shown in FIGURE 9, the sprocket wheel 298 is disposed just ahead of the forward end of the looping arm 270. Rigidly secured to the forward end of the frame plate 286 is the rear end of a generally Z-shaped strap 300, the forward end of which is fixedly secured to a two-piece housing 302 of a conveyor driving assembly, generally indicated at 304. As best shown in FIGURE 4, the driving assembly includes an output shaft 306 having a sprocket wheel 308 fixedly secured thereto. An endless chain 310 is trained about the sprocket wheel 308 and the sprocket wheel 298, the chain having a series of outwardly extending lugs 312 rigidly secured to spaced links thereof. The horizontal flight of the endless chain 310 is supported by an upper flange 314 formed on the main frame plate 286.

From the above it can be seen that the main frame plate 286 of the endless conveyor 284, the housing 302 of the conveyor driving assembly 304, and the leaf engaging rods 282 are all rigidly secured together to form a unitary construction. This construction is mounted on the respective side frame of the vehicle for movement into different positions of vertical adjustment by any suitable means, and as shown, a vertical mounting rod 316 is rigidly secured at its upper end to the strap 288 extending transversely between the rods 282. The mounting rod 316 extends downwardly in telescoping relation either to the vertical tube 104 of the left hand side frame or the vertical tube 162 of the right hand side frame. The mounting rod 316 is held in adjusted vertical position within the respective tube by a turnbolt 318 threaded in the respective tube and arranged to engage suitable apertures or the like formed in the mounting rod.

As best shown in FIGURE 10, the housing 302 of the conveyor drive assembly 304 is provided with an exterior vertically extending segmental cylindrical surface 320 for receiving either the forward vertical tubular frame member 99 of the left hand side frame or the forward vertical tubular member 182 of the right hand side frame member. A cooperating clamp plate 322 is secured to the housing 302, as by bolts 324 or the like, on the opposite side of the respective forward vertical tubular member to provide initial securement. The housing 302 is locked in adjusted position on the respective forward vertical tubular member by means of a turnbolt 326 threaded in the clamp plate and arranged to engage within suitable apertures or the like formed in the forward vertical tubular member.

Referring now more particularly to FIGURES 12–15, the conveyor driving mechanism 304 is arranged to advance the upper flight of the endless conveyor 284 forwardly a predetermined distance in response to the pivotal movement of the looping arm in either direction past the point of string restraint provided by the string supplying and tensioning mechanism 40. Moreover, the conveyor driving mechanism 304 is operable to vary the predetermined distance of forward travel of the endless conveyor so that the operator can vary the number of tobacco hands which are to be mounted on the tobacco stick.

To this end, the housing 302 includes a first section 328 having a vertical input shaft 330 suitably journalled therein. Fixed to the lower end of the shaft 330 within the housing section 328 is a miter gear 332 disposed in meshing engagement with a cooperating miter gear 334 mounted for rotation on a transverse horizontally extending shaft 336 journalled at one end of the housing section 328 and at its other end portion in an inner bridge portion 337 of a cooperating housing section 338. Formed integrally with the miter gear 334 is a clutch element 340 having a series of circumferentially spaced clutch teeth 342 formed on the end thereof opposite from the miter gear 334. Suitably splined on the shaft 336 for rotative movement therewith and axial movement with respect thereto is a second clutch element 344 having a cooperating series of clutch teeth 346 arranged to interengage with the clutch teeth 342 on the clutch element 340.

The end of the shaft 336 supported by the housing portion 337 extends inwardly to the interior of the housing section 338 and has rigidly secured thereto a crank arm 348. Fixed to the outer end of the crank arm 348 is a pin 350 which pivotally receives one end of a connecting link 352, the opposite end of which has a pin 354 extending therethrough. The pin 354 also receives a bifurcated end of a link 356 pivotally mounted on the output shaft 306. The end of the output shaft opposite from the sprocket wheel 308 is suitably journalled in an apertured boss 358 formed in the housing section 338. The opposite end portion of the shaft 306 is journalled in a sleeve 360 which in turn is journalled in an opening 362 formed in the housing section 328.

Figure 15:
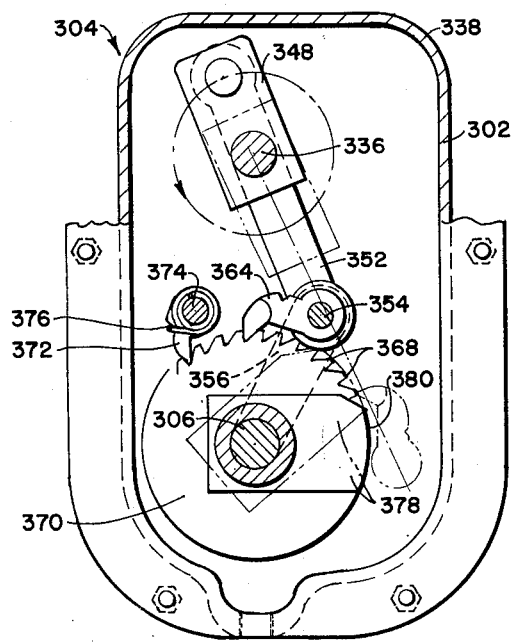
FIGURE 15 is a cross-sectional view taken along the line 15—15 of FIGURE 13.

As best shown in FIGURE 15, the pin 354 also has pivotally mounted thereon a pawl 364 having a wedge-shaped outer end 366 arranged to engage in notches formed by a plurality of circumferentially spaced teeth 368 formed on the periphery of a ratchet wheel 370 fixed to the output shaft 306 adjacent the bifurcated link 356. A holding pawl 372 is journalled on a stub shaft 374 fixed in the housing section 328 and extending therefrom into the interior of the housing section 338. Preferably, the pawl 372 is spring urged, as by a coil spring 376, into engagement with the ratchet wheel teeth 368.

Rigidly secured to the inner end of the sleeve 360 for pivotal movement therewith is a plate 378 having a peripheral cam surface 380 which is arcuate about the axis of the shaft 306 with a radius substantially equal to the radius of the tips of the ratchet wheel teeth 368. The pawl 364 has a laterally extended cam portion 382 which is substantially coextensive with the wedge-shaped end 366 and disposed in the same vertical plane as the cam surface 380 for engagement therewith.

Figure 12:
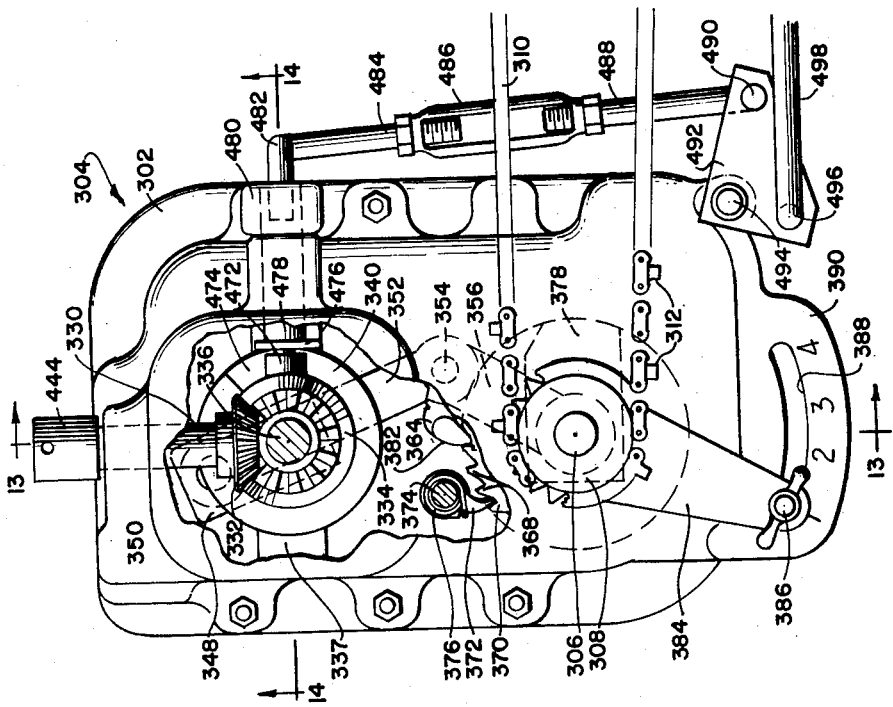
FIGURE 12 is an enlarged side elevational view of the conveyor driving mechanism, with certain parts broken away for purposes of clearer illustration.
Figure 13:
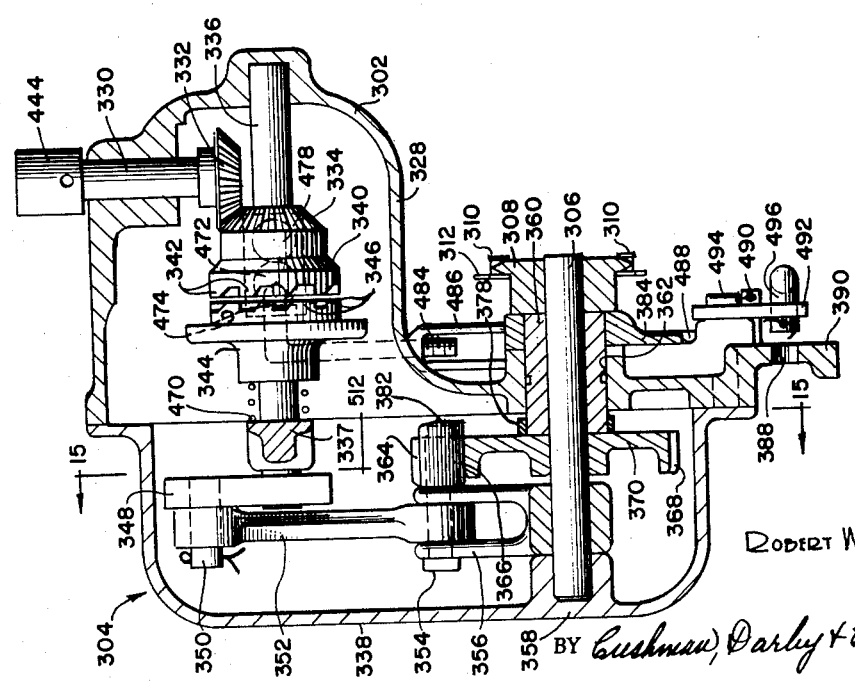
FIGURE 13 is a cross-sectional view taken along the line 13—13 of FIGURE 12.
Figure 14:
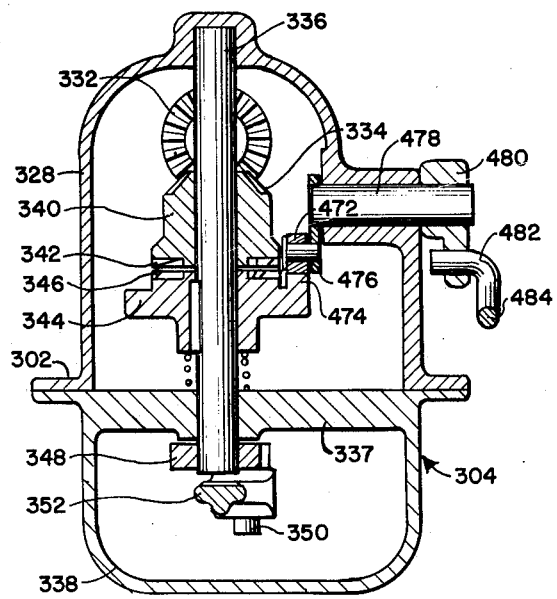
FIGURE 14 is a cross-sectional view taken along the line 14—14 of FIGURE 12.

As best shown in FIGURES 12 and 13, the outer end of the sleeve 360 has one end of an adjusting arm 384 rigidly secured thereto, the opposite end of the arm being apertured to receive a bolt and wing nut assembly 386. The bolt 386 also extends through an elongated slot 388 formed in a depending flange portion 390 of the housing section 328. The slot 388 is actuated about the axis of the output shaft 306 and provides a means whereby the adjusting arm can be locked by the bolt and wing nut assembly 386 into a plurality of different positions, such positions being indicated by the numerals 1, 2, 3 and 4 in FIGURE 12.

It will be seen that movement of the adjusting arm into these different positions of adjustment will cause the cam plate 378 to be moved into different positions of rotative adjustment with respect to the ratchet wheel 370. For example, in position 1, such as illustrated in FIGURE 12, the cam plate 378 will be positioned as shown in solid lines in FIGURE 15. In this position, the pawl 364, when moved into its extreme position prior to its engagement with the ratchet wheel teeth 368 to advance the ratchet wheel will be disposed in the position shown in phantom lines in FIGURE 15. In this position, the cam surface 380 is disposed out of the path of movement of the cam 382 of the pawl 364. Thus, the pawl in its ratchet wheel advancing movement will immediately engage a tooth of the latter and effect a rotative movement thereof equal to the counterclockwise movement of the pawl, as viewed in FIGURE 15.

When the adjusting arm is moved into position 4, the cam plate 378 will assume the phantom line position as shown in FIGURE 15. In this position, the cam surface 380 will be in engagement with the cam 382 of the pawl 364 during its initial counterclockwise movement, as shown in FIGURE 15, thus maintaining the pawl out of engagement or approximately four ratchet wheel notches. Of course, when the pawl reaches the end of the cam surface 380, the end 366 thereof will move down into the associated ratchet wheel notch and the subsequent movement of the pawl will effect a corresponding movement of the ratchet wheel. It will be understood that by moving the adjusting arm into the intermediate positions 2 and 3, the cam plate 378 will be moved into corresponding intermediate positions so that the amount of rotative movement of the ratchet wheel and hence output shaft 306 can be appropriately varied.

It will be understood that the input shaft 330 of the conveyor driving mechanism 304 is suitably connected to the internal combustion engine 22, independent of the connection of the latter with the drive transmission 26, so that in normal operation the input shaft 330 will be constantly in rotation. Any suitable means may be provided for transmitting the rotative movement of the internal combustion engine to the conveyor drive mechanisms 304 mounted on each of the side frames 12 and 14.

As best shown in FIGURES 2 and 3, the output shaft of the internal combustion engine 22 is drivingly connected with an input shaft 392 of a gear box 394 of conventional design, as by a belt and pulley assembly 396. The gear box 394 is mounted adjacent the main drive transmission assembly 26 just below the platform panel 80 and has a pipe 398 extending upwardly therefrom to a second gear box 400 fixed to the upper end of the main vertical frame member 50 of the left hand side frame. A shaft 402 extends from the gear box 394 to the gear box 400, the shaft constituting the output shaft of the gear box 394 and the input shaft of the gear box 400. Extending forwardly from the gear box 400 is a shaft 406 having its forward end journalled in a bearing 408 fixed to the intermediate top frame channel member 204. The forward end of the shaft 406 is drivingly connected to the rearward end of an upwardly inclined shaft 410, as by a universal coupling 412, the forward end of which is drivingly connected to an input shaft 414 of a gear box 416, as by universal coupling 420.

The gear box 416 is fixedly secured to the forward top frame channel member 200 and includes a pair of oppositely extending output shafts 422 and 424. A short shaft 426 is drivingly connected between the output shaft 422 and an input shaft 428 of a gear box 430, as by a pair of universal couplings 432 and 434. The gear box 430 is fixed to the longitudinal top frame channel 196 and has an output shaft 436 extending downwardly therefrom for driving connection with a hollow rectangular shaft 438 as by a universal coupling 440. Slidably mounted within the lower end of the hollow shaft 438 is the upper end portion of a rectangular shaft 442, the lower end of which is drivingly connected with the input shaft 330 of the conveyor driving mechanism 304 mounted on the left hand side frame 12, as by a universal coupling 444.

The opposite output shaft 424 of the gear box 416 is drivingly connected, as by a universal coupling 446, with one end of a hollow rectangular shaft 448, the other end of which slidably receives a rectangular shaft 450. The opposite end of the shaft 450 is drivingly connected with an input shaft 452 of a gear box 454, as by a universal coupling 456. The gear box 454 is fixed to the forward top frame channel member 200 and has an output shaft 458 extending downwardly therefrom for driving connection, as by a universal coupling 460, with the upper end of a hollow rectangular shaft 462. The lower end of the shaft 462 slidably receives the upper end portion of a rectangular shaft 466, the lower end of which is drivingly connected with the input shaft 330 of the conveyor drive mechanism 304 mounted on the right hand side frame 14, as by a universal connection 468.

It will be understood that suitable means (not shown) is provided for actuation adjacent the operator's station 34 for engaging and disengaging the belt and pulley assembly 396 to effect rotary movement of the input shafts 330 of the conveyor drive mechanisms.

In normal operation, the clutch elements 340 and 344 of the conveyor drive mechanism are maintained out of engagement so that the rotary movement of the input shaft 330 is not transmitted to the sprocket wheel 308 on the output shaft 306. As indicated above, the looping arm and conveying mechanism 42 is operable to effect movement of the endless conveyor 284 in response to the swinging movement of the looping arm past the point of string restraint. In normal operation, such swinging movement of the looping arm will occur during the looping of the string around each hand of tobacco.

To this end, the clutch element 344 is resiliently urged into a position of engagement with the clutch element 340 by a coil spring 470 mounted in surrounding relation to the shaft 336 between the clutch element 344 and housing portion 337. The clutch element 344 is maintained in a position out of engagement with the clutch element 340, against the action of the spring 470, by means of a roller 472 engaging a cam surface 474 formed on the clutch element 344. The roller 472 is journalled on the outer end of an arm 476 having its inner end fixed to shaft 478 journalled in the housing section 328 extending longitudinally rearwardly therefrom. The rearward end of the shaft 478 extends outwardly of the housing section 328 and has rotatably adjustably fixed thereon an arm 480, the outer end of which pivotally receives a bent end 482 of a connecting rod 484 which forms a part of a turnbuckle connecting link.

As best shown in FIGURE 12, a turnbuckle collar 486 is threaded at its upper end to the lower end of the rod 484 and the lower end of the collar 486 is oppositely threaded to the upper end of a rod 488 having a lower bent end 490 pivoted to a crank plate 492. The crank plate is pivoted, as by a pin 494, to the housing section 328 and also receives the forward bent end 496 of a connecting rod 498 which extends from the crank plate 492 rearwardly through an upstanding apertured lug 500 formed in the main casting 276, as shown in FIGURE 9. Preferably, a coil spring 502 is mounted in surrounding relation to the rearward end portion of the connecting rod 498 between a collar 504 fixed thereto and the apertured casting lug 500.

Figure 11:
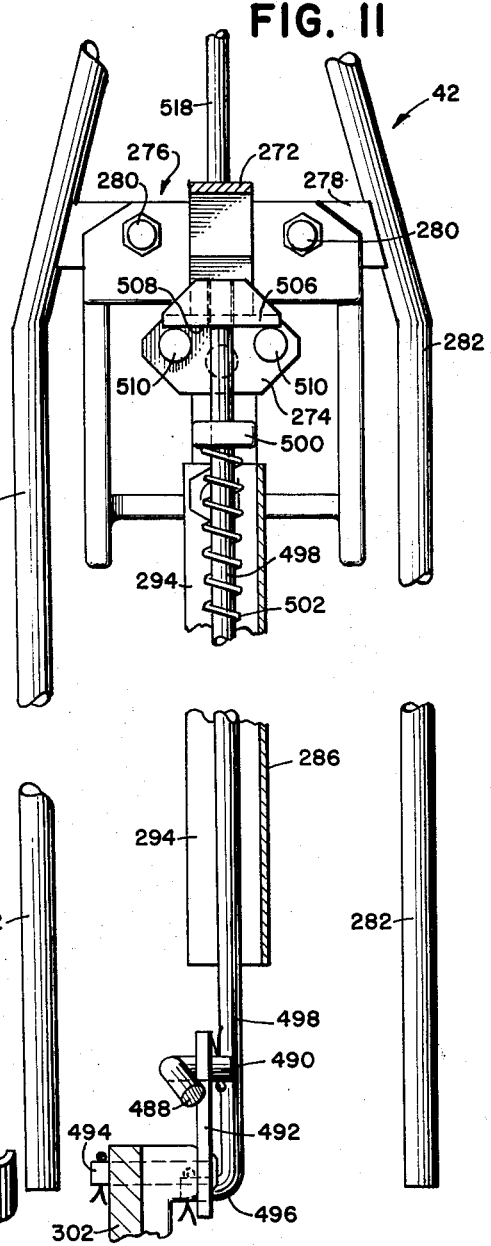
FIGURE 11 is an enlarged, fragmentary cross-sectional view taken along the line 11—11 of FIGURE 9.

As best shown in FIGURE 11, the rearward end of the connecting rod 498 extends beyond the apertured lug 500 and has rigidly secured to the rearward extremity thereof a block 506 having a flat, vertical cam surface 508 formed on the forward face thereof and extending on opposite sides of the rod 498. The looping arm mounting plate 278 has a pair of transversely spaced upstanding pins 510 fixed thereon which are arranged to engage the flat cam surface 508.

It will be seen that the spring 502 resiliently urges the looping arm 270 into a centrally disposed position by virtue of the engagement of the flat cam surface 508 with the pins 510, as shown in FIGURE 11. When the looping arm is moved in either direction past the point of string restraint as, for example, during the normal tobacco hand looping operation, the looping arm mounting block 274 will be pivoted about its vertical axis thus causing one of the pins 510 to move the connecting rod 498 rearwardly by virtue of the engagement of the pin with the cam surface 508. Rearward movement of the connecting rod 498 will pivot the crank plate 492 in a counter-clockwise direction, as viewed in FIGURE 12, which, in turn, causes an upward movement of the turnbuckle connecting link. This upward movement of the turnbuckle connecting link in turn effects a rotative movement of the shaft 478 by virtue of the connection of the rod 484 with arm 480. In this way, roller 472 which is normally disposed in a position of engagement with the cam surface 474 of the clutch element 344 is moved in a clockwise direction, as shown in dotted lines in FIGURE 13, thus permitting the teeth 346 of the clutch element 344 to move into intermeshing engagement with the teeth 342 of the rotating clutch element 340 under the action of the spring 470.

It will be noted that in the normal looping operation of the tobacco hand, the looping arm is only momentarily pivoted out of its central position beyond the point of string restraint so that the spring 502 will act to substantially immediately return the looping arm 270 to its central position and hence the roller 472 to its normal position, as shown in dotted lines in FIGURE 13. The cam surface 474 on the clutch element 344 is inclined and projects toward the clutch element 340, so that when the clutch element 344 engages the clutch element 340, the projecting cam surface 474 will be moved out of a position wherein it would be engaged by the roller 472 and is in its normal central position. Thus, the clutch element 344 will remain in engagement with the clutch element 340 until the inclined cam surface 474 moves into engagement with the roller thereby camming the clutch element 344 out of engagement with the cam element 340 against the action of the spring 470. In normal operation, the roller 472 will return to its normal position before a complete revolution of the clutch element 344 so that the cam surface 474 limits the rotation of the shaft 336 to one rotation for each pivotal movement of the looping arm in the normal tobacco hand looping procedure.

It will be noted that the rotation of the shaft 336 will effect a complete rotation of the crank arm 348 and that movement of the latter will effect an arcuate oscillation of the pawl 364 by virtue of the connection of the links 352 and 356 therewith. The counterclockwise arcuate movement of the pawl 364, as viewed in FIGURES 12 and 15, effects rotation of the output shaft 306 to an extent depending upon the position of the adjusting arm 384, as described above. Of course, since sprocket wheel 308 is connected to the output shaft 306, the endless chain 310 trained thereabout will be moved so that its upper flight riding on the flange 314 is advanced forwardly a predetermined distance.

In accordance with the disclosure of the Poythress application, the tobacco leaves looped by the string in series interconnected hands during the normal operation of the apparatus will alternately be supported on opposite sides of the looping arm with the string extending therebetween. Thus, by feeding the initial hand to one of the lugs 312 of the conveyor during subsequent operation as the endless chain 310 is advanced forwardly, such lug will engage the string extending between the last hand on the conveyor and the adjacent hand supported on the looping arm, thus moving the latter from the looping arm onto the conveyor. This procedure is repeated as each successive bunch of tobacco leaves is looped into a hand on the looping arm 270. It will be noted that the rods 282 serve to maintain the leaves of the hands riding on the conveyor 284 out of contact with the associated structure thereof and for sliding movement therealong as the conveyor moves. In this way, the conveyor is adapted to move a predetermined number of tobacco hands in spaced relation along the upper flight, the spacing between the hands being determined by the setting of the adjustable arm 384.

The looping arm and conveying mechanism 42 is also operable to indicate to the operator when the conveyor has moved a sufficient number of series interconnected tobacco hands throughout the upper flight thereof so that they are in a position to have a tobacco stick moved into supporting relation therewith. Any suitable means may be provided for effecting this signal and as best shown in FIGURES 3 and 9, a lever 514 is pivoted, as at 516, intermediate its ends to the forward portion of the conveyor frame plate 286. The upper end portion of the lever 514 extends above and adjacent to the upper flight of the endless chain 310 in a position to be engaged by the forwardmost tobacco hand on the conveyor or the string attached thereto. The lower end of the lever 514 is pivoted to the forward end of a bent rod 518, the rearward end portion of which extends through an apertured lug 520 formed on the casting 276 in depending relation therewith. The lug 520 supports the rearward end portion of the rod 518 for longitudinal sliding movement and the rearward extremity thereof has a rubber tube 522 mounted thereon which preferably is of a bright color, such as red. A coil spring 524 is mounted in surrounding relation to the rod 518 and has the rearward end thereof in engagement with the lug 520 and its forward end in engagement with a collar 526 fixed to the rod 518. It will be seen that the spring 524 resiliently urges the rod 518 into its forwardmost position, as illustrated in FIGURES 3 and 9.

It will be seen that as the forewardmost tobacco hand carried by the conveyor or the string attached thereto engages the upper end of the lever, during the forward movement of the conveyor, the lever 514 will be pivoted about the axis 516, thus causing the rubber tube 522 to move rearwardly with the rod 518 against the action of the spring 524. It will be noted that the rubber tube is disposed in a position in full view of an operator stationed on the operator's seat. If desired, the tube may be positioned so that it will move into engagement with the operator to provide a more positive signalling means.

When the signalling means is thus actuated the conveyor has positioned thereon a plurality of series interconnected tobacco hands spaced longitudinally along the upper flight of the endless chain in a position to have a tobacco stick moved into supporting relation therewith.

*Tobacco Stick Moving Mechanism*

Again, as indicated above, the present apparatus provides a pair of tobacco stick moving mechanisms 44, one associated with each looping arm and conveying mechanism 42 on each side frame of the vehicle. Since the stick moving mechanisms 44 are substantially identical, a description of one should suffice to give a clear understanding of both.

As best shown in FIGURES 16–22, the stick moving mechanism 44 includes an operating lever 528 having its lower end bent to form a handle 530 and its upper end rigidly secured to a shaft 532 intermediate the ends thereof. The shaft 532 is journalled in a pair of transversely spaced depending apertured lugs 534 formed in the casting 276, as best shown in FIGURE 17. Rigidly secured to and extending forwardly from the lever 528 is a bar 536 having its forward end pivotally connected, as at 538, to the rearward end of a bent tobacco stick moving bar 540.

As best shown in FIGURES 19 and 20, the bar 540 includes a forward portion 542 which is inclined downwardly somewhat with respect to the horizontal. The rearward end of this forward portion of the stick moving bar 540 is slidably supported by an inverted U-shaped bar 544 fixed to the rearward strap 292 interconnecting the inner rod 282 with the conveyor frame plate 286. The outer extremity of the stick moving bar 540 has a vertically extending angle iron section 546 rigidly secured thereto for receiving one end of a tobacco stick S, as shown in FIGURE 19. The tobacco stick S is supported for longitudinal rearward sliding movement by the strap 292 and an upwardly facing inclined channel member 548 rigidly secured to the outer surface of the conveyor frame plate 286 adjacent the central portion thereof.

Rigidly secured to the lever shaft 532 is the rearward end of an arm 550, the outer end of which has a pin 552 extending therefrom. Pin 552 engages within an elongated slot 554 formed in one end of a bent connecting link 556, the opposite end of which is pivotally connected, as at 558, to the outer end portion of an arm 560.

As best shown in FIGURE 18, the arm 560 is fixed to a shaft 562 journalled in a pair of forwardly extending transversely spaced apertured lugs 564 formed in the casting 276. Mounted on the side of the conveyor frame plate 286 adjacent the tobacco stick moving bar 540 is an arm 566 having one end thereof rigidly secured to the shaft 562 and the opposite end thereof provided with a laterally extending stick engaging pin 568. A second arm 570 is disposed forwardly of the arm 566 in general longitudinal alignment therewith and has its rearward end fixed to a shaft 572 journalled in a pair of transversely spaced apertured plates 574 rigidly secured to the intermediate strap 290 and extending forwardly from the ends thereof. As before, the outer end of the arm 570 has a laterally extending stick engaging pin 576 fixed thereto. The arm 570 is mounted for simultaneous pivotal movement with the arm 566 by any suitable means, such as a crank arm 578 rigidly secured to the shaft 572 adjacent the opposite end thereof having its outer end pivotally connected with the forward end of a connecting rod 580, the rearward end of which is pivotally connected with the arm 560.

Referring now more particularly to FIGURES 21 and 22, it will be seen that an elongated tobacco hand balancing rod 582 is disposed adjacent the side of the conveyor frame plate 286 opposite the tobacco stick moving bar 540. The forward end of the rod 582 is bent downwardly, as at 584, and pivotally connected with the strap 300 which serves to interconnect the forward end of the conveyor frame plate 286 with the housing 302 of the conveyor driving mechanism 304. The rearward end of the rod 582 is supported by a J-shaped strap 586 rigidly secured to the sprocket wheel supporting strap 296, as by welding or the like. The J-shaped strap 586 supports the rearward end of the rod 582 for upward pivotal movement about its pivotal axis. The rod is moved upwardly by means of a roller 588 journalled on the outer end of an elongated arm 590 having its inner end rigidly secured to the arm 560.

It will be seen that the stick moving mechanism 44 is disposed in the position illustrated in FIGURES 19 and 21 during the movement of the series interconnected tobacco hands along the upper flight of the endless chain 310. As previously indicated, the rods 282 serve to maintain the tobacco hands moved by the conveyor out of engagement with the various parts of the stick moving mechanism described above. When the conveyor has received a sufficient number of tobacco hands, as when the signaling means is actuated, the operator grasps the operating handle 530 and moves the same rearwardly. The initial rearward movement of the actuating lever 528 results in a rearward sliding movement of the stick moving bar 540. The engagement of the angle iron 546 with the end of the tobacco stick S moves the latter rearwardly in sliding engagement with the strap 292 and channel 548. During this initial movement, the pin 552 travels from one end of the slot 554 in link 556, so that during subsequent rearward movement of the operating handle 530 the pin 552 engages the end of the slot 554 and thus causes a pivotal movement of the arms 560 and 578. Since these arms are rigidly secured to the shafts 560 and 572 respectively, the arms 566 and 570 fixed thereto on the stick engaging bar side of the conveyor will be pivoted so that their pins 568 and 570 will move upwardly into engagement with the stick thus raising the stick into supporting engagement with the series interconnected tobacco hands carried by the conveyor, as shown in FIGURE 20.

At the same time, roller 588 on the end of arm 590 will be moved into engagement with the rod 582, thus moving the latter upwardly in conjunction with the upward movement of the tobacco stick, as shown in FIGURE 22. The rod 582 has the effect of balancing the tobacco hands carried by the conveyor as the stick S is moved into supporting engagement therewith. With the stick moved into the position shown in FIGURE 20 the operator merely grasps the free ends thereof and lifts up to carry therewith the tobacco hands on the conveyor in engagement therewith.

*Operation*

Referring now more particularly to FIGURE 23 of the drawings, the present apparatus is particularly suited for operation in a tobacco field planted such that the tobacco plants are disposed in groups G of four evenly-spaced, parallel rows R of tobacco plants. The rows R of each group are spaced apart a distance substantially less than the distance between adjacent groups so that there is provided a relatively wide middle F between each group of rows. The spacing of the middle F generally corresponds to the spacing which would be provided by planting a field uniformly but leaving out every fifth row.

The preferred manner in which the present apparatus proceeds through such a field is illustrated by the arrows in FIGURE 23. As indicated above, the leaves of tobacco plants ripen from the bottom to the top and during a harvesting season several priming runs through the field are completed before all the leaves have been harvested. That is, during the first pass through the field, the lowermost leaves are removed from the plants and in subsequent passes through the field the next higher group of leaves are removed from the plants, etc.

To this end, it will be noted that the seats 34 and 38 of the present apparatus are mounted for movement into a plurality of vertically adjusted positions, such positions serving to maintain the operator at the desired height with respect to the tobacco plants and the level thereon at which the leaves are removed. Of course, the foot-engaging structures 114, 124 and 174 are also vertically adjustable along with the seats. In addition, the unitary construction carrying the looping arm and conveying mechanisms 42 and the stick moving mechanisms 44 are vertically adjustable by means of the tubes 316 and clamps 322. Furthermore, the telescoping tubes 260 and 262 of the string supplying and tensioning mechanisms 40 permit vertical adjustability of the latter in accordance with the position of the looping arms 270. Thus, before proceeding through the field, the above adjustments are initially made to accommodate the particular operator and field. Also, as noted above, the position of the adjusting arm 384 of the conveyor driving mechanism 304 determines the spacing of the tobacco hands which are arranged to be mounted on the tobacco stick and accordingly the operator sets the adjusting arm to a desired position.

In proceeding through the field, in general, the leaves of the plants are progressively removed from two outer rows of each group G while proceeding in one direction and the leaves from the other two rows are removed while proceeding in the opposite direction. It will be noted that the side frames 12 and 14 are arranged to be spaced horizontally apart a distance sufficiently to enable the frame to straddle one row R of tobacco plants. To accommodate different row spacings, it will be noted that the right hand side frame 14 may be readily moved into different positions of lateral adjustment, by means of bolts 206 and 194.

As stated above, the present apparatus provides a pair of seats 34 and 38 for accommodating two operators, the operator on seat 34 having control of the forward progress of the apparatus through suitable actuating devices (not shown) for controlling the operation of the drive transmission assembly 22 and, of course, the operator stationed on seat 34 steers the vehicle through the operation of the steering mechanism 32. The actuating devices for the internal combustion engine 22 and drive transmission assembly 26 are preferably operable so that forward speeds within a range of approximately 5 to 10 miles an hour can be accomplished.

Means is provided on the frame 10 of the apparatus for storing a supply of sticks S and, as shown in FIGURES 1-4, such means preferably embodies an open box-like construction 600 rigidly secured to the central portion of each longitudinally extending top frame member and extending laterally outwardly therefrom. Fixed to the forward end of each longitudinal top frame member is a pair of angle members 602 disposed so that one horizontal leg thereof is fixed to the frame and the other leg extends vertically upwardly therefrom, the vertical legs of each pair of angle iron members being spaced transversely apart to receive the stick S therebetween, as shown in FIGURE 2. In addition, stick supporting bent rods 604 are detachably secured within the upper ends of the tubes 64 and 68 adjacent the platform panel 70.

When the apparatus is utilized by two operators only, the panels 70, 78 and 80 provide a compartment for receiving the stick mounted series interconnected hands formed by the operator on the left hand side frame 12. The stick mounted series interconnected hands prepared by the operator on the right hand side frame may be conveniently mounted on a platform panel 606 carried by the channel members of the top frame 16. As best shown in FIGURE 1, the panel 606 has its side edges resting on the lower flanges of the longitudinal top frame members 196 and 198 and its ends resting on the lower flanges of the intermediate channel member 204 and rear channel member 202.

In order to facilitate the mounting of the sticks on the compartment provided by the panel 606 there is provided a lower foot step 608 mounted on the upper end of a mounting member 610, the lower end of which is rigidly secured to the outer end of the right hand side frame member 148, as best shown in FIGURES 1 and 2. Extending outwardly from the main vertical frame member 140 above the foot step 608 is a platform 612 upon which the operator may stand to place the sticks in the compartment provided by the panel 606.

It will be understood that as the apparatus proceeds along a pair of adjacent rows R, each operator, during the movement of the vehicle, will remove the ripe lowermost leaves from the tobacco plants in the row to his right until he has gathered a sufficient number of leaves to form a hand. The hand is formed by bunching the leaves together with their stem ends in substantial alignment. Next, the operator loops the string extending from the lower end 268 of the string supplying and tensioning means 40 about the aligned stem ends of the bunch of tobacco leaves. The initial hand may be tied manually and this hand is then supported on the upper surface of of the looping arm 270, as by the string attached thereto. After the next bunch of leaves has been removed from the plants, they are moved into engagement with the string extending between the initial hand and the tube 268 which is maintained under tension by the take-up arm 242 and tensioning disks 224. The hand is then rotated about the tube 268 into and in engagement with the looping arm 270 in one direction thereabout. The next bunch of leaves is looped in the same manner except that the rotation thereof about the tube 268 is in the opposite direction. In this way, alternate hands will be disposed on opposite sides of the looping arm. Moreover, each pivotal movement of the looping arm 270 in either direction effects an advance of the conveyor 284 a distance determined by the setting of the adjusting arm 384, in the manner indicated above. After the initial hand has been fed to the lugs 312 of the conveyor, each subsequent hand which is looped will cause the conveyor to move the forwardmost hand on the looping arm onto the conveyor, as by engagement of the lugs 312 with the string extending thereto.

The above procedure is repeated as the apparatus proceeds along the row until such time as the forwardmost hand or the string attached thereto engages the lever 514 and the forward advance of the conveyor pivots the lever about its axis 516, thus moving the rubber tube either into the line of sight of the operator or into the body of the operator. This indicates to the operator that the hands on the conveyor are in a position to have a stick moved into supporting engagement therewith. It will be noted that the hands are supported by the upper flight of the conveyor in spaced relation with alternate hands being disposed on opposite sides thereof, the rods 282 serving to guide the hands for longitudinal movement and to maintain them in a spread condition out of contact with the associated mechanisms.

A tobacco stick S is disposed in position to be moved by the stick moving mechanism 44 by placing the forward end thereof in engagement with the angle iron 546 and then resting the same on the channel 548 and the strap 292 as shown in FIGURE 19. With the stick thus supported, the operator then grasps the handle 530 and actuates the lever 528 to move the stick into supporting engagement with the series interconnected hands supported on the conveyor in the manner shown in FIGURES 19–22 and described above. The string between the last hand on the stick and the initial hand on the looping arm is then broken and tied to the stick. In tying the string and removing the stick and the series interconnected hands supported thereby, the arm 260 of the string supplying and tensioning mechanism may be pivoted transversely so that it will not interfere with the stick or the operator. It will be noted that the stick moving mechanism is such that the stick is moved initially in a rearward horizontal direction and then in an upward vertical direction, which serves to center the hands thereon. The stick is then lifted upwardly and placed on the appropriate platform for storage. In two-man operation the machine is usually stopped during the time one or the other of the operators is removing a stick from the conveyor and placing the same in a storage compartment and replacing a new stick on the channel 548 and strap 292.

A preferred mode of operation of the present invention utilizes three operators, two of which are stationed at the seats 34 and 38, the third operator serving to remove the hand mounted sticks and to replace empty sticks on the stick moving mechanism and tie string to both ends of the stick. With this operation, a trailer 614, of conventional construction, is hitched to the draw bar 84 in laterally offset relation to the vehicle 10. It will be noted that where the side frames 12 and 14 straddle the outermost row of a group and the vehicle is proceeding in the direction indicated by the arrows in FIGURE 23, the trailer 614 will be arranged to move in the middle F. By moving through the field so that such furrow is always to the left of the machine as shown in FIGURE 23, all of the rows can be harvested and the trailer will at all times be maintained for movement in a middle F. As an alternative to the pattern shown by the arrows in FIGURE 23 and for purposes of more convenient turning, the vehicle may proceed along two rows of one group in one direction and then the opposite two rows of another group in the opposite direction. After the harvesting of these rows is finished the opposite rows of the first group are then harvested. This procedure gives the operator a greater transverse space within which to execute the required 180° turn. Of course, any suitable sequence can be utilized within the principle noted above.

In three-man operation, the vehicle can be continuously moved, the third operator serving to perform the jobs while the vehicle is moving which required the machine to be stopped in two-man operation. Moreover, the third operator places all of the stick mounted series interconnected hands on the trailer 608 and when the same is loaded it is detached from the draw bar 84 and a new trailer mounted thereon. The loaded trailer can be transported to the curing barn without the necessity of further handling the sticks carried thereby or changing their support in any way until they are ready to be moved into the curing barn.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In an apparatus of the type described, the combination comprising a vehicle frame including a pair of vertically extending side frames, traction wheel means rotatably mounted on the rear end of one of said side frames to ride in a furrow adjacent one side of a row of tobacco plants, means carried by said one side frame for driving said traction wheel means, steerable wheel means rotatably mounted on the forward end of said one side frame in general longitudinal alignment with said traction wheel means to ride in the same furrow, foot pedal actuated steering means carried by said one side frame for steering said steerable wheel means, means on said one side frame for accommodating a first operator disposed forwardly of said traction wheel means in a position to permit the first operator to actuate said foot pedal steering means, idler wheel means rotatably mounted on the rear end of the other side frame in a position generally opposite said traction wheel means to ride in a furrow adjacent the opposite side of a row of tobacco plants, means on said other side frame disposed forwardly of said idler wheel means for accommodating a second operator, said vehicle frame also including a top frame extending between the upper end portions of said side frames and rigidly securing the same together in horizontally spaced relation, said top frame being disposed above the lower surface of said wheel means a vertical distance sufficient to permit passage of mature tobacco plants thereunder, said vehicle frame being free of rigid structure extending between said side frames below said top frame, said first and second operator accommodating means being disposed below said top frame so that operators thereon will be positioned alongside the tobacco plants passing under said top frame, and means mounted on said vehicle frame adjacent each operator accommodating means for tying tobacco leaves in hands to be mounted on tobacco sticks, each of said last-mentioned means comprising means for restraining longitudinal movement of a length of string and permitting movement of the string therefrom under tension, a looping arm mounted for movement in response to manual looping of the string from said restraining means about successive tobacco hands to interconnect the same in series, conveyor means for receiving the series interconnected hands from said arm and moving the same into a stick receiving position, means independently operatively connected between said traction wheel driving means and said conveyor means and operable in response to the movement of said looping arm for advancing said conveyor means a predetermined distance, and means for varying the predetermined distance of advance of said conveyor means by said advancing means.

2. The combination as defined in claim 1 including means for moving a tobacco stick into supporting relation to the series interconnected tobacco hands when the latter are disposed in their stick receiving position.

3. The combination as defined in claim 2 including means for indicating to an operator stationed at said operator accommodating means when said series interconnected tobacco hands have been moved by said conveyor means into their stick receiving position.

4. The combination as defined in claim 1 wherein said string restraining means includes a string guiding arm mounted on said vehicle frame for movement between an operative position wherein a lower end thereof is disposed adjacent and above said looping arm and an inoperative position wherein said lower end is disposed away from said looping arm.

5. In an apparatus of the type described, the combination comprising means for restraining longitudinal movement of a length of string and permitting movement of the string therefrom under tension, a looping arm mounted for movement in response to manual looping of the string from said restraining means about successive hands of tobacco to interconnect the same in series, conveyor means for receiving the series interconnected hands from said arm and moving the same into a stick receiving position in spaced relation, means operable in response to the movement of said arm for advancing said conveyor means a predetermined distance, and means for varying the predetermined distance of advance of said conveyor means to thereby vary the spacing between the hands in said stick receiving position.

6. The combination as defined in claim 5 wherein said conveyor advancing means comprises a ratchet wheel drivingly connected with said conveyor means and having a series of circumferentially spaced teeth, a pawl mounted for arcuate oscillation adjacent the teeth of said ratchet wheel for engagement therewith in one direction, and means operable in response to one movement of said looping arm for moving said pawl through one complete oscillation.

7. In an apparatus of the type described, the combination comprising means for restraining longitudinal movement of a length of string and permitting movement of the string therefrom under tension, a looping arm mounted for movement in response to manual looping of the string from said restraining means about successive hands of tobacco to interconnect the same in series, conveyor means for receiving the series interconnected hands from said arm and moving the same into a stick receiving position in spaced relation, means operable in response to the movement of said arm for advancing said conveyor means a predetermined distance, and means for varying the predetermined distance of advance of said conveyor means to thereby vary the spacing between the hands in said stick receiving position, said conveyor advancing means comprising a ratchet wheel drivingly connected with said conveyor means and having a series of circumferentially spaced teeth, a pawl mounted for arcuate oscillation adjacent the teeth of said ratchet wheel for engagement therewith in one direction, and means operable in response to one movement of said looping arm for moving said pawl through one complete oscillation, said pawl moving means comprising a driving shaft and a driven shaft, clutch element fixed to one of said shafts, a cooperating clutch element splined to the other shaft and resiliently urged into meshing engagement with said fixed clutch element, said splined clutch element having a cam surface thereon, a roller movable in response to the movement of said looping arm from a position of engagement of said cam surface maintaining said splined clutch element out of meshing engagement with said fixed clutch element to a position out of engagement with said cam surface permitting said splined clutch element to mesh with said fixed clutch element.

8. The combination as defined in claim 6 wherein said conveyor advance varying means comprises a cam plate mounted for movement into different positions of arcuate adjustment with respect to the path of oscillatory movement of said pawl, said cam plate and said pawl having interengaging cam surfaces operable to maintain said pawl out of engagement with said ratchet wheel teeth during varying portions of the initial movement of said pawl in said one direction depending upon the arcuate position of said cam plate.

9. The combination as defined in claim 8 wherein said cam plate is connected with an adjusting arm for moving said cam plate into various positions of arcuate adjustment.

10. In an apparatus of the type described, the combination comprising means for restraining longitudinal movement of a length of string and permitting movement of the string therefrom under tension, a looping arm mounted for movement in response to manual looping of the spring from said restraining means about successive hands of tobacco to interconnect the same in series, conveyor means for receiving the series interconnected hands from said arm and moving the same into a stick receiving position in spaced relation, and means for moving a tobacco stick upwardly into supporting relation to the series interconnected hands when disposed in said stick receiving position.

11. The combination as defined in claim 10 including means operable in response to the movement of said looping arm for advancing said conveyor means a predetermined distance.

12. The combination as defined in claim 11 including means for varying the predetermined distance of advance of said conveyor means by said advancing means.

13. The combination as defined in claim 10 including means for mounting said looping arm for pivotal movement about a vertical axis.

14. In an apparatus of the type described, the combination comprising a string guiding arm having a lower end, means for guiding a length of string under tension through said lower end, a looping arm mounted for movement in response to manual looping of the string from said string guiding means about successive hands of tobacco to interconnect the same in series, means mounting the upper end of said string guiding arm for resiliently maintained pivotal movement about a horizontal axis extending transversely with respect to the direction of extent of said looping arm between an operative position where-in the lower end of said string guiding arm is disposed adjacent and above said looping arm and an inoperative position wherein said lower end is disposed in transversely spaced relation to said looping arm, conveyor means for receiving the series interconnected hands from said looping arm and moving the same into a stick receiving position in spaced relation, and means for moving a tobacco stick upwardly into supporting relation to the series interconnected hands when disposed in said stick receiving position.

15. The combination as defined in claim 14 wherein said string guiding means includes a pair of spring pressed tensioning disks and a spring urged take-up arm mounted for pivotal movement between said disks and said guiding arm lower end.

16. The combination as defined in claim 14 wherein said stick moving means includes an actuating handle movable through a predetermined stick moving path, means operable in response to the initial movement of said handle through said path for effecting a substantially horizontal longitudinal movement of the stick, and means operable in response to the subsequent movement of said handle through said path for effecting a substantially vertical transverse movement of the stick into supporting engagement with said hands.

17. In an apparatus of the type described, the combination comprising an endless conveyor having a generally horizontally disposed upper flight for supporting a plurality of series interconnected tobacco hands with alternate hands extending downwardly on opposite sides thereof, and means for moving a tobacco stick upwardly between alternate hands into supporting relation thereto.

18. The combination as defined in claim 17 including a pair of transversely spaced horizontally extending rods below said upper conveyor flight for engaging the downwardly extending hands and maintaining the same in a spread condition to permit movement of a stick into supporting engagement therewith.

19. In an apparatus of the type described, the combination comprising an endless conveyor having a generally horizontally disposed upper flight for supporting a plurality of series interconnected tobacco hands with alternate hands extending downwardly on opposite sides thereof, and means for moving a tobacco stick upwardly between alternate hands into supporting relation thereto, said stick moving means comprising an actuating handle movable through a predetermined operative path, means operable in response to the initial movement of said handle through said path for effecting a generally horizontal longitudinal movement of the stick, and means operable in response to the subsequent movement of said handle through said path for effecting a substantially vertical transverse movement of the stick.

20. The combination as defined in claim 19 wherein said handle is fixed to the outer end of a pivoted actuating lever, and said longitudinal movement effecting means comprises a bar having one end pivoted to said lever for movement therewith and its other end portion mounted for generally horizontal sliding movement.

21. The combination as defined in claim 20 wherein the other end of said bar has means thereon for engaging an end of the stick and wherein fixed means is provided for supporting a stick in a position to be engaged by said end engaging means and for substantially horizontal sliding movement therewith.

22. The combination as defined in claim 20 wherein said vertical movement effecting means comprises a pair of pivoted arms having stick engaging means on the outer ends thereof and lost motion means connecting said pivoted arms to said lever.

23. The combination as defined in claim 22 including a balancing rod pivotally mounted on the side of said conveyor opposite from the stick engaging means, and a rod engaging pivoted arm connected for movement with said first mentioned pivoted arms for moving said balancing rod vertically upwardly on one side of the conveyor in conjunction with upward vertical movement of the stick on the other side of the conveyor.

References Cited in the file of this patent

UNITED STATES PATENTS

| | | | |
|---|---|---|---|
| 775,557 | Dieckmann | Nov. 22, | 1904 |
| 1,134,206 | King | Apr. 6, | 1915 |
| 1,863,028 | Pardee | June 14, | 1932 |
| 2,218,510 | Albertson et al. | Oct. 22, | 1940 |
| 2,271,359 | Zeruneith | Jan. 27, | 1942 |
| 2,319,829 | Russell | May 25, | 1943 |
| 2,396,589 | Marzocchi | Mar. 12, | 1946 |
| 2,518,965 | Whitley | Aug. 15, | 1950 |
| 2,646,941 | Borges | July 28, | 1953 |
| 2,699,337 | Best | Jan. 11, | 1955 |
| 2,704,158 | Long | Mar. 15, | 1955 |
| 2,715,968 | Davis et al. | Aug. 23, | 1955 |
| 2,748,731 | Bell | June 5, | 1956 |
| 2,763,114 | Carruthers | Sept. 18, | 1956 |
| 2,786,585 | Davis et al. | Mar. 26, | 1957 |
| 2,818,929 | Kucera | Jan. 7, | 1958 |
| 2,818,930 | Kucera | Jan. 7, | 1958 |
| 2,859,001 | Lenk | Nov. 4, | 1958 |
| 2,904,193 | Poythress | Sept. 15, | 1959 |
| 2,929,184 | Lamouria | Mar. 22, | 1960 |
| 2,940,615 | Long | June 14, | 1960 |